(12) United States Patent
Saito et al.

(10) Patent No.: US 7,258,496 B2
(45) Date of Patent: Aug. 21, 2007

(54) OPTICAL FIBER CONNECTION TOOL AND OPTICAL FIBER CONNECTION METHOD

(75) Inventors: Daigo Saito, Sakura (JP); Kazuhiro Takizawa, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 10/503,620

(22) PCT Filed: Feb. 10, 2003

(86) PCT No.: PCT/JP03/01383

§ 371 (c)(1),
(2), (4) Date: Aug. 5, 2004

(87) PCT Pub. No.: WO03/067295

PCT Pub. Date: Aug. 14, 2003

(65) Prior Publication Data

US 2005/0105872 A1 May 19, 2005

(30) Foreign Application Priority Data

Feb. 8, 2002 (JP) .............................. 2002-033055

(51) Int. Cl.
*G02B 6/255* (2006.01)
(52) U.S. Cl. ........................ 385/98; 385/134; 385/95; 385/97
(58) Field of Classification Search ............... 385/134, 385/98
See application file for complete search history.

(56) References Cited

U.S. PATENT DOCUMENTS

| 4,784,456 | A | * | 11/1988 | Smith ........................ 385/55 |
| 6,033,124 | A | * | 3/2000 | Lesueur et al. ............... 385/53 |
| 6,033,214 | A | | 3/2000 | Merz | |
| 6,179,482 | B1 | | 1/2001 | Takizawa et al. | |
| 6,186,672 | B1 | | 2/2001 | Takizawa et al. | |
| 6,457,873 | B1 | * | 10/2002 | Heier et al. ................... 385/70 |
| 6,764,229 | B1 | * | 7/2004 | Iga et al. ...................... 385/98 |

FOREIGN PATENT DOCUMENTS

CA 1310527 C 11/1992

(Continued)

Primary Examiner—Frank G. Font
Assistant Examiner—James P. Hughes
(74) Attorney, Agent, or Firm—Sughrue Mion, PLLC

(57) ABSTRACT

An optical fiber connecting tool is provided in which an optical fiber connecting tool 5 is used which has a ferule 7, a connecting structure 10 which has two clamping sections 18, 19 which are disposed in a ferule 7. A pre-installed optical fiber 6 and a newly installed optical fiber 17 are clamped in a butt-connected condition by a clamping section 18. The newly installed optical fiber 17 is clamped by the other clamping section 19. An optical fiber connecting tool 1 is provided which has an open/close member 2 which is detachably disposed on the clamping section 18 and another open/close member 3 which is detachably disposed on the another clamping section 19 such that the both of the open/close members 2, 3 can be operated independently. Also, a method for connecting optical fibers according to the present invention prevents an increase in a loss due to a bent optical fiber and a damage in the optical fiber by extracting the open/close member 2 from the clamping section 18 before extracting the open/close member 3 from the another clamping section and dispose a deformation which is generated on the tip section of the optical fiber when the optical fiber connecting part is attached on the tip section of the optical fiber according to steps for performing an extracting operation for the open/close member e from the another clamping section. Here, for the optical fiber connecting part, for example, various members can be adapted such as a member which does not have the above explained ferule, and a member which realize a connection and a clamping operation for the optical fibers by a structure of only the above explained connecting structure.

29 Claims, 16 Drawing Sheets

FOREIGN PATENT DOCUMENTS

| | | |
|---|---|---|
| EP | 0 290 188 A2 | 11/1988 |
| JP | 63-286805 A | 11/1988 |
| JP | 9-73023 A | 3/1997 |
| JP | 10-160957 A | 6/1998 |
| JP | 2000-56175 A | 2/2000 |
| JP | 2001-166184 A | 6/2001 |
| KR | 1997-03201 B | 3/1997 |

* cited by examiner

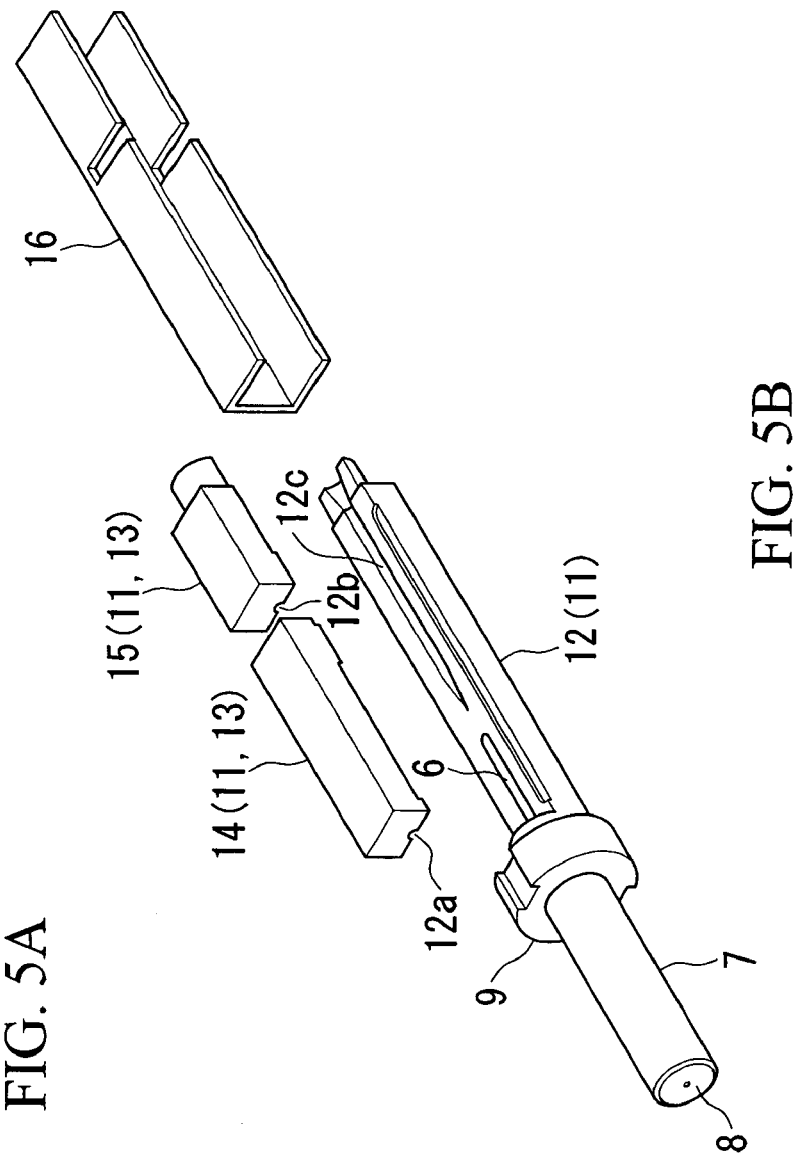
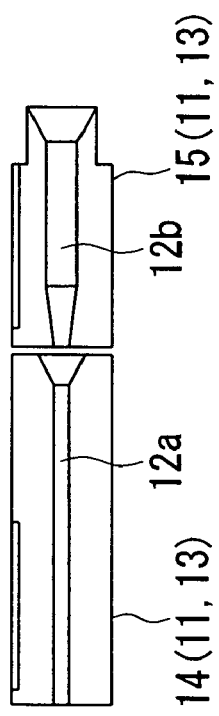
FIG. 5A
FIG. 5B

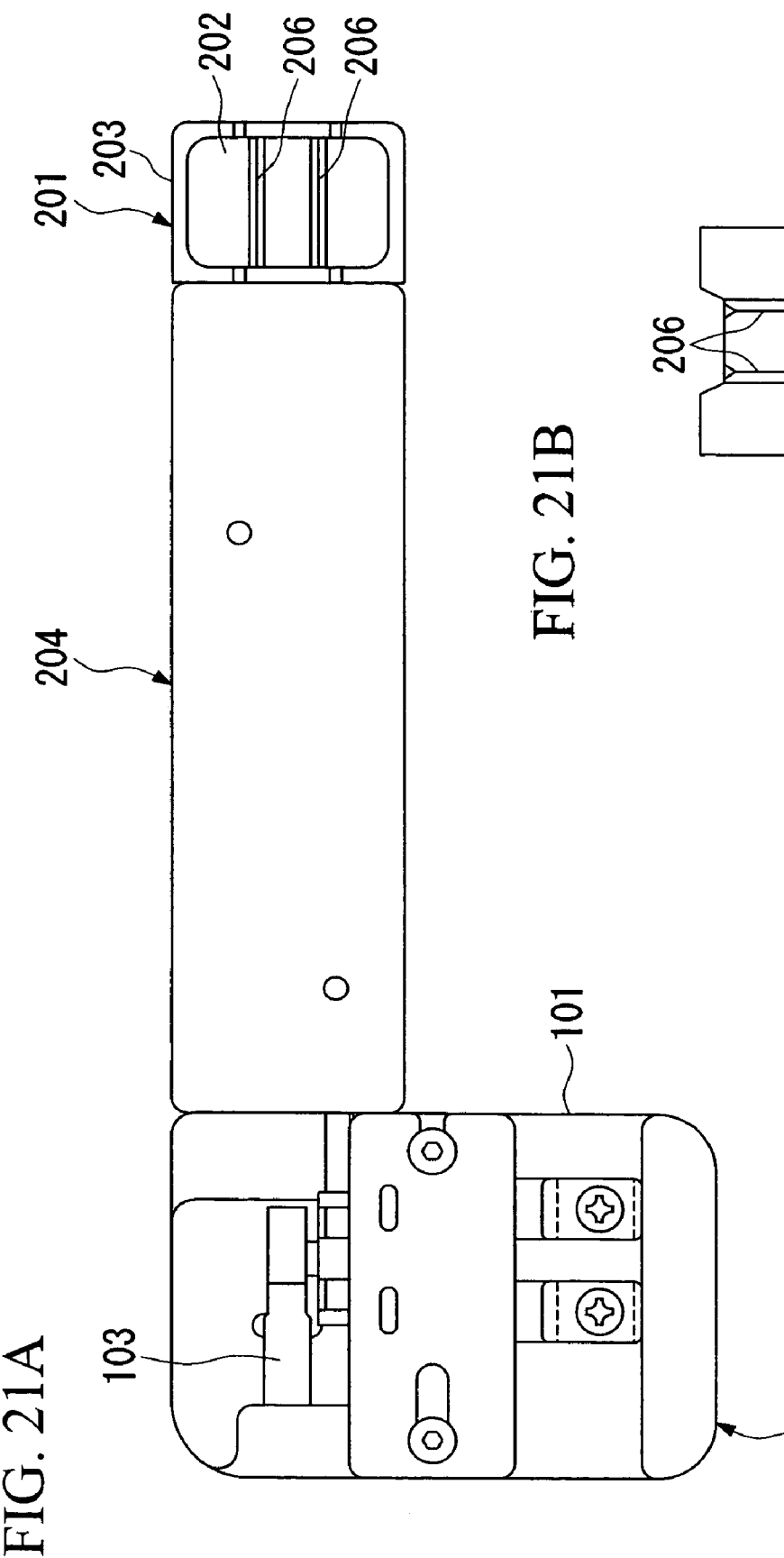
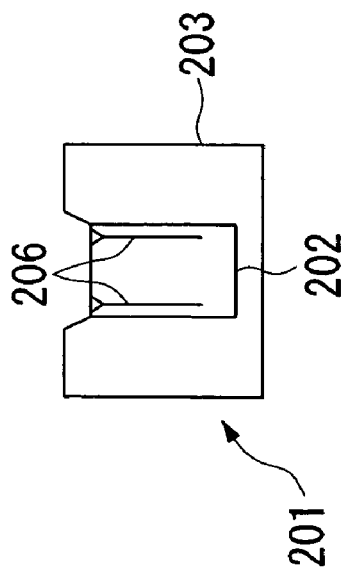
FIG. 21A
FIG. 21B

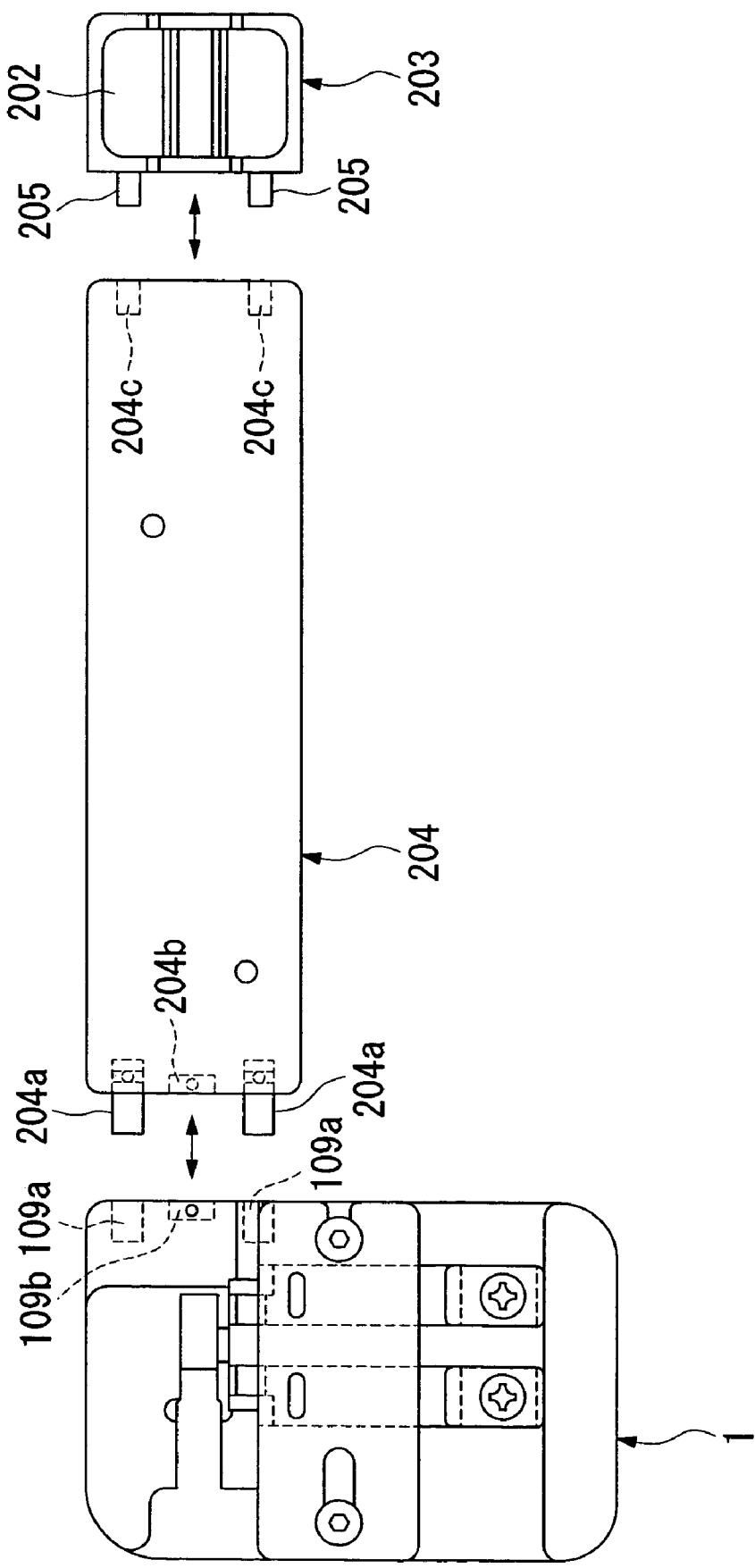

OPTICAL FIBER CONNECTION TOOL AND OPTICAL FIBER CONNECTION METHOD

TECHNICAL FIELD

The present invention relates to an optical fiber connecting tool and a method for connecting optical fibers. In particular, the present invention relates to an optical fiber connecting tools and a method for connecting optical fibers which are effective for connecting the pre-installed optical fiber and the newly installed optical fiber to the optical fiber connecting part by a connecting structure of the optical fiber connecting part.

BACKGROUND ART

Recent year, an optical fiber connector which is provided with a ferule in which an optical fiber is inserted in a center of the ferule and a connecting structure which is disposed in a tip section of the ferule is proposed for an optical fiber connector which can be attached to the tip section of the optical fiber easily.

In such a case, the connecting structure is provided with a two-divided connecting elements which are formed by assembling two divided halves and a clamping spring which engages to the outside of the connecting element so as to compress both of the divided halves in its attaching direction such that one of the divided halves is divided into two pieces such as a main clamp and a substitute clamp and a groove is formed for an alignment on a attaching surface with the other one of the divided halves.

Consequently, in order to attach an optical fiber connector which has an above explained structure to a tip of an optical fiber, for example, an optical fiber connecting tool which has a pair of open/close member is used so as to insert both of the open/close members between the main clamp and the other divided half, and between the substitute clamp and the other divided halve. The clamping condition by both of the clamps is released by releasing the main clamp and the substitute clamp. The tip section of the newly installed optical fiber is inserted between the main clamp and the other divided halve via the substitute clamp; thus, the tip of the newly installed optical is butt-connected to the tip of the pre-installed optical fiber in an inside of the main clamp in detail.

Consequently, both of the open/close members of the optical fiber connecting tool is extracted from between the main clamp and the other divided half and from between the substitute clamp and the other divided half simultaneously under such a condition. The pre-installed optical fiber and the newly installed optical fiber are clamped under a butt-connected condition by the main clamp; thus, a section of the newly installed optical fiber which is coated is clamped by the substitute clamp.

By doing this, it is possible to attach the optical fiber connector to the tip section of the newly installed optical fiber such that the pre-installed optical fiber near the optical fiber connector and the newly installed optical fiber are maintained under a butt-connected condition.

However, in the above explained optical fiber connecting tool, in a case in which the tip section of both of the optical fibers is deformed by a butt-connecting force of the newly installed optical fiber against the pre-installed optical fiber near the optical fiber connector, both of the optical fibers are clamped under such a deformed condition; thus, there are problems such as an increase in a loss due to a bent optical fiber and a damage of the tip of the optical fiber which is caused by a concentrated stress to the tip section of the both of the deformed optical fibers; therefore, these problems may cause a defect connection.

DISCLOSURE OF INVENTION

The present invention was made in consideration of the above explained conventional problems. An object of the present invention is to provide an optical fiber connecting tool and a method for connecting optical fibers in which it is possible to release the deformation which is generated on the tip section of at least the optical fiber by the butt-connecting force between the optical fibers and prevent the defect connection while avoiding the increase in a loss which is cause by a bent optical fiber and a loss in the tip section of the optical fiber.

The present invention provides structures below for solving the above explained problems.

In the present invention, an optical fiber connecting tool is provided which comprises one clamping section which clamps a periphery of a butt-connection section of an optical fiber which is butt-connected for maintaining a butt-connection condition, a base which supports an optical fiber connecting part in which a connecting structure is disposed which has another clamping section which clamps a new optical fiber which is butt-connected to a pre-installed optical fiber which is previously inserted in the clamping section in the optical fiber, an open/close member which is disposed in the clamping section so as to be able to open/close the another clamping section, and another open/close member which is disposed so as to be inserted to/detached from the clamping section so as to be able to open/close the another clamping section, wherein both of the open/close members can be operated independently.

According to the optical fiber connecting tool according to the present invention, an open/close member is inserted in one clamping section so as to open the clamping section. Other open/close member is inserted in the another clamping section so as to open the another clamping section. In addition, the optical fiber is inserted in the connecting structure so as to butt-connect the optical fibers. In such a case, it is acceptable if the optical fiber may be inserted from both of facing sides of the connecting structure. Also, it is acceptable if there is a relationship such that either one of the optical fibers is a pre-installed optical fiber which is inserted in the connecting structure and the other one of optical fibers is a newly installed optical fiber which is butt-connected to the pre-installed optical fiber. In addition, either one of the open/close member is extracted from the clamping section and the clamping section is closed; thus the optical fibers are clamped under the butt-connected condition. In addition, after that, the other open/close member is extracted from the another clamping section, and the another clamping section is closed: thus, the optical fibers are clamped. By doing this, after closing the one clamping section, it is possible to maintain the connecting condition by steps for closing the another clamping section while there is few deformation in the optical fiber which is caused by the butt-connecting force which is applied to the optical fiber. That is, it is possible to release the deformation in a direction of the optical fiber before closing the other clamping section even if there is a deformation which is generated on the tip sections of the both of the optical fibers due to the butt-connecting force of the optical fibers. Therefore, the tips of the both of the optical fibers are not clamped under such a deformed condition. Also, the tip sections of the both of the optical fibers are not damaged due to the bent optical fibers and an increase in the loss. Therefore, it is possible to restrict the defect connection; thus, it is possible to enhance the reliability greatly.

Also, in the optical fiber connecting tool according to the present invention, it is possible to adapt a structure in which one of the optical fibers which are butt-connected by the connecting structure is a pre-installed optical fiber which is previously inserted in the clamping section from one of the connecting structure by fixing in a predetermined position in the connecting structure by an optical fiber fixing section, another one of the optical fiber which is butt-connected by the connecting structure is inserted in the clamping section via another clamping section from other side of the connecting structure so as to be a newly installed optical fiber which is butt-connected to the optical fiber in the clamping section, the another clamping section clamps a section which protrudes from the clamping section for the newly installed optical fiber which is clamped by the clamp. According to the optical fiber connecting tool according to the present invention, an open/close member is inserted in a clamping section so as to open the clamping section. Other open/close member is inserted in the other clamping section so as to open the other clamping section. The connecting structure performs a butt-connecting operation for the tip of the pre-installed optical fiber which is disposed in the connecting structure in advance to the tip of the newly installed optical fiber by inserting the newly installed optical fiber in the one clamping section via another clamping section. In addition, either one of the open/close member is extracted from the clamping section and the clamping section is closed; thus the pre-installed optical fiber and the newly-installed optical fiber are clamped under the butt-connected condition. In addition, after that, the other open/close member is extracted from the other clamping section, and the other clamping section is closed: thus, the newly installed optical fiber is clamped. By doing this, it is possible to connect the pre-installed optical fiber and the newly-installed optical fiber without generating deformation. Therefore, it is possible to release the deformation in a direction of the newly installed optical fiber before closing the other clamping section even if there is a deformation which is generated on the tip sections of the newly installed optical fiber against the pre-installed optical fiber due to the butt-connecting force of the optical fibers. Therefore, the tips of the both of the optical fibers are not clamped under such a deformed condition. Also, the tip sections of the both of the optical fibers are not damaged due to the bent optical fibers and an increase in the loss. Therefore, it is possible to restrict the defect connection; thus, it is possible to enhance the reliability greatly.

Also, the present invention provides a method for connecting optical fibers which uses a clamping section which clamps a periphery of a butt-connection section of an optical fiber which is butt-connected for maintaining a butt-connection condition, a base which supports an optical fiber connecting part in which a connecting structure is disposed which has another clamping section which clamps a new optical fiber which is butt-connected to a pre-installed optical fiber which is previously inserted in the clamping section in the optical fiber, an open/close member which is disposed in the clamping section so as to be able to open/close the another clamping section; and another open/close member which is disposed so as to be inserted to/detached from the clamping section so as to be able to open/close the another clamping section, wherein, a newly installed optical fiber is inserted into a clamping section, after that, a closing motion of the clamping section starts, consequently, a closing motion of the other clamping section starts. Such a method for connecting the optical fibers includes not only a feature that the motion of the another clamping section is started after the one clamping section is closed but also a feature that the movement of the closing the another clamping section is started (before completing the clamping operation for the pre-installed optical fiber and the newly installed optical fiber in the one clamping section) before completing the closing movement of the one clamping section.

Also, the present invention provides a method for connecting optical fibers in which an optical fiber connecting tool is used which is provided with a connecting structure which has a clamping section which maintains a butt-connecting condition by clamping a periphery of the butt-connecting section which is butt-connected and another clamping section which clamps a newly installed optical fiber which is butt-connected to a pre-installed optical fiber which is previously inserted in the clamping section among the optical fibers, the pre-installed optical fiber which is contained in the connecting structure in advance by the clamping section of the connecting structure and the newly installed optical fiber which is separate from the pre-installed optical fiber in a butt-connecting condition are clamped under a butt-connection condition by the clamping section of the connecting structure, the clamping section is opened by inserting the open/close member which can be inserted into/detached from the clamping section is inserted into the clamping section when the newly installed optical fiber is clamped by the other clamping section of the connecting structure, simultaneously, the other open/close member which can be inserted into/detached from the other clamping section is inserted into the other clamping section so as to open the other clamping section, under this condition, the newly installed optical fiber is inserted from the other side so as to butt-connect the tip of the newly installed optical fiber to the tip of the pre-installed optical fiber, under this condition, one of the open/close member is extracted from the clamping section so as to clamp the pre-installed optical fiber and the newly installed optical fiber by the clamping section under a butt-connected condition, consequently, the other open/close member is extracted from the other clamping section so as to clamp the newly installed optical fiber by the other clamping section. According to a method for connecting the optical fibers according to the present invention, an open/close member is inserted in a clamping section so as to open the clamping section. Other open/close member is inserted in the other clamping section so as to open the other clamping section. Consequently, the pre-installed optical fiber is inserted from one side of the connecting structure under such a condition. The newly installed optical fiber is inserted from the other side thereof. Thus, the tip of the newly installed optical fiber is butt-connected to the tip of the pre-installed optical fiber. In addition, either one of the open/close member is extracted from the clamping section and the clamping section is closed; thus the pre-installed optical fiber and the newly-installed optical fiber are clamped under the butt-connected condition. In addition, after that, the other open/close member is extracted from the other clamping section, and the other clamping section is closed: thus, the newly installed optical fiber is clamped. By doing this, it is possible to connect the pre-installed optical fiber and the newly-installed optical fiber without generating deformation. Therefore, it is possible to release the deformation in a direction of the newly installed optical fiber before closing the other clamping section even if there is a deformation which is generated on the tip sections of the newly installed optical fiber against the pre-installed optical fiber because the butt-connecting force of the optical fibers is too great. Therefore, the tips of the both of the optical fibers are not clamped under such a deformed condition. Also, the tip sections of the both of the optical fibers are not damaged due to the bent optical fibers and an increase in the loss. Therefore, it is possible to restrict the defect connection; thus, it is possible to enhance the reliability greatly.

Here, this method for connecting the optical fibers can be used for an operation for connecting the optical fibers in the connecting structure of the optical fiber connecting part by using the optical fiber connecting tool according to the present invention.

BRIEF DESCRIPTION OF DRAWINGS

FIG. 5A is a dissembled isometric view for showing a structure for a ferule with a connecting structure of the optical fiber connector shown in FIG. 2A.

FIG. 5B is a view in which a lid element which forms the connecting structure of the ferule with a connecting structure shown in FIG. 5A is viewed from a direction which faces a base element.

FIG. 21A is a plan view for showing a condition in which an optical fiber clamp is disposed in a separate position from a parts-containing-groove via a supporting bar which is attached to the optical fiber connecting tool shown in FIG. 1A.

FIG. 21B is a side view for showing an optical fiber connector shown in FIG. 21A.

FIG. 22 is a dissembled plan view for showing a detaching structure between the optical fiber connecting tool and the supporting bar, and a detaching structure between the supporting bar and the optical fiber clamp.

BEST MODE FOR CARRYING OUT THE INVENTION

Figure 1A:
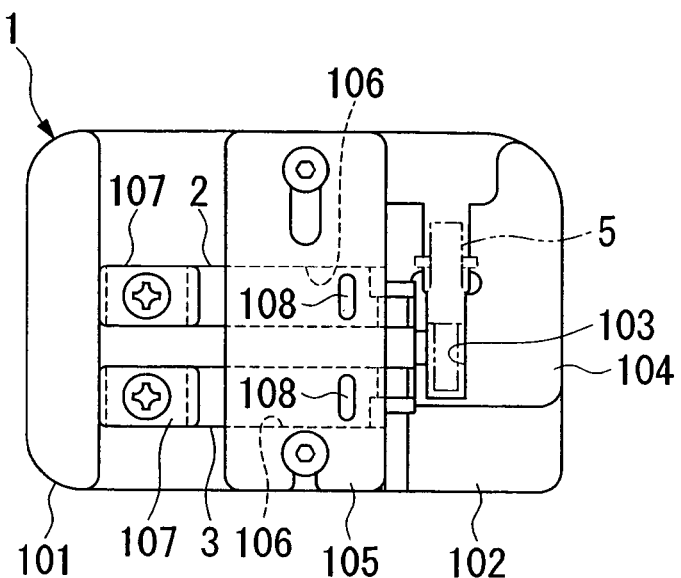
FIG. 1A is an approximate plan view for showing a first embodiment of the optical fiber connecting tool according to the present invention.

The present invention is explained in detail with reference to attached drawings.

Hereinafter, the embodiments of the present invention which are shown in the drawings are explained.

FIGS. 1 to 15 show a first embodiment of the optical fiber connecting tool according to the present invention. This optical fiber connecting tool 1 can be applied effectively for a case in which the optical fiber connecting part is attached to a tip section of the optical fiber. As shown in FIGS. 1A and B, the optical fiber connecting tool 1 is provided with a base 101 which fixes an optical fiber connecting part 5, and two open/clOse members 2, 3 which are disposed on the base 101.

The optical fiber connecting tool 1 according to the present invention can be applied for various type of optical fiber connecting tools 5.

Figure 3:
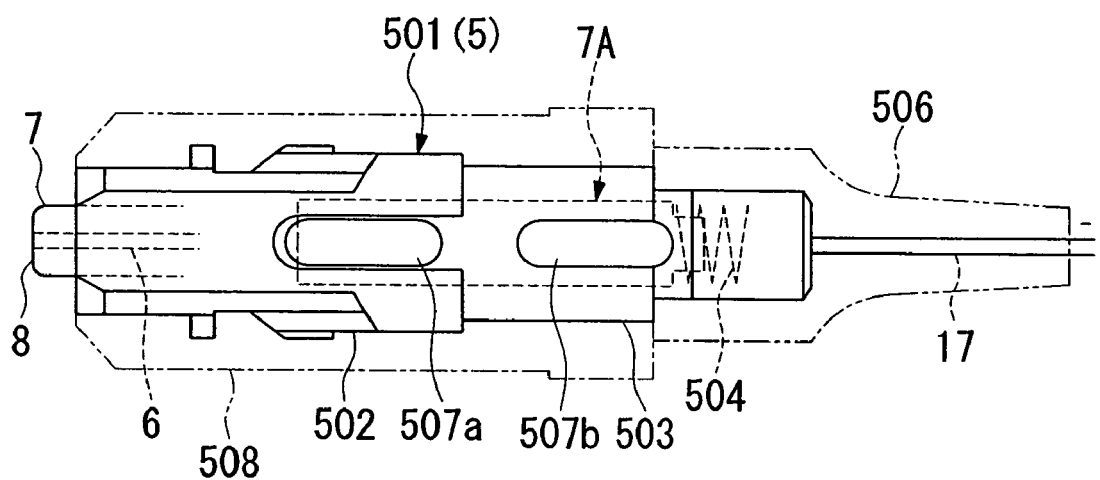
FIG. 3 is a front view for showing an optical fiber connector shown in FIG. 2A.

The optical fiber connecting part 5 which is shown in FIG. 2A to FIG. 4 contains a ferule 7 of an SC (SC; Single fiber coupling optical fiber connector) optical connector which is defined by a JIS SC 5973 etc. in a housing 502 (hereinafter, there are cases in which a reference numeral 501 is added to the optical fiber connecting part for explanations). Furthermore, the optical fiber connecting part 5 contains a connecting structure 10 (see FIG. 4 and FIG. 5) which are assembled in a rear end which faces an attaching end surface 8 of the tip of the ferule 7 in a sleeve stop ring 503 which is connected to the housing 502. Hereinafter, this optical fiber connecting part is called an "optical fiber connector"; thus, there is a case in which a reference numeral 501 is added for an explanation. The connecting structure 10 has a structure in which it is assembled to a rear end of the ferule 7 such that the ferule 7 and the connecting structure 10 are contained unitarily in inside of the housing 502 of the optical fiber connector 501 and inside of the stop ring 503 as a ferule 7A with a connecting structure. Also, as shown in FIG. 3, the optical fiber connector 501 can be connected detachably to a female connector housing such as an optical connector adapter as similar as an SC optical fiber connector by attaching it to a knob 508 on an outside of the housing 502.

Figure 4:
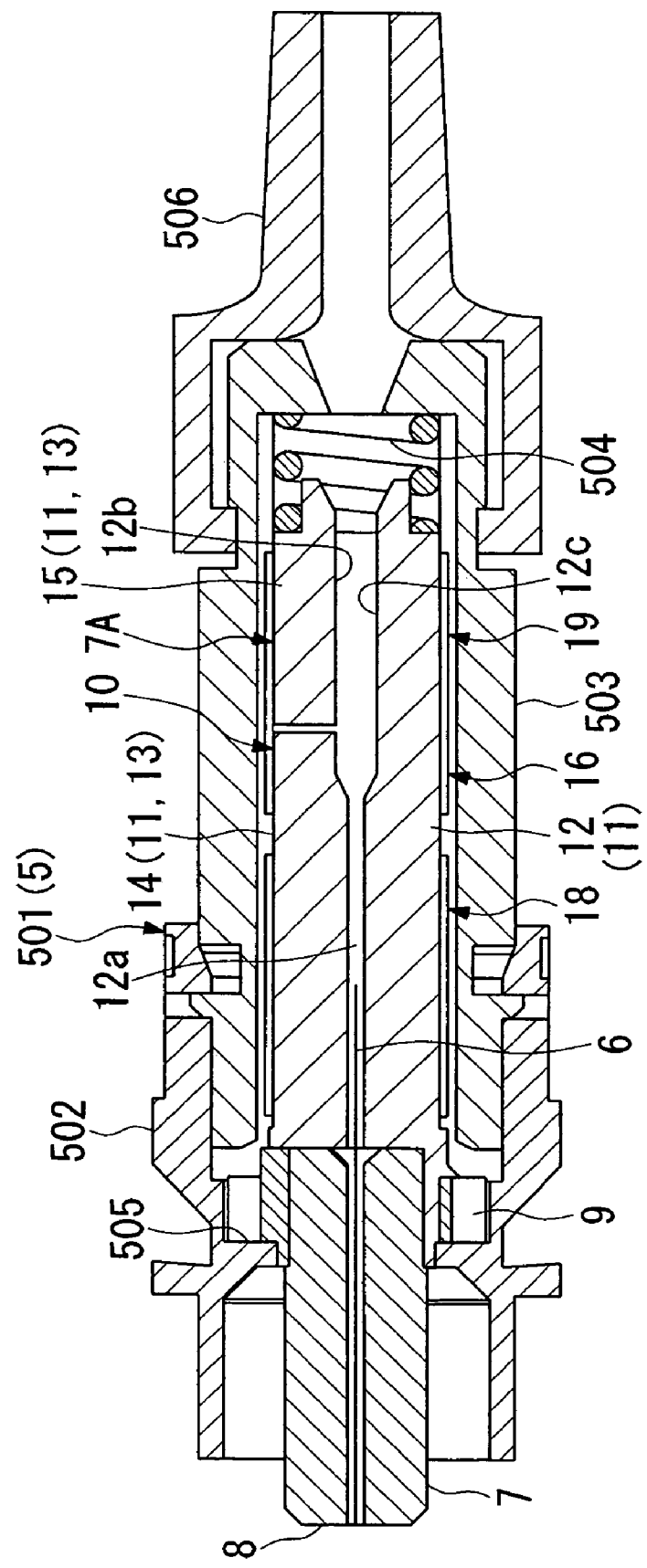
FIG. 4 is a vertical cross section for showing an inner structure of the optical fiber connector shown in FIG. 2A.
Figure 6:
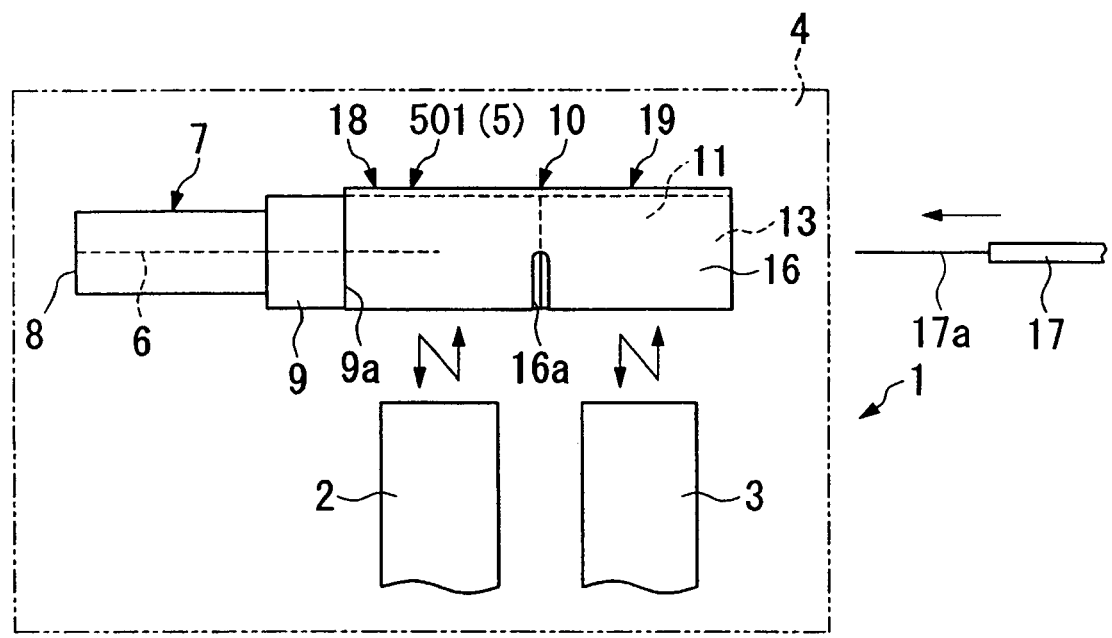
FIG. 6 is a plan view for showing a condition in which the optical fiber connector shown in FIG. 2a is supported by the optical fiber connecting tool.
Figure 7:
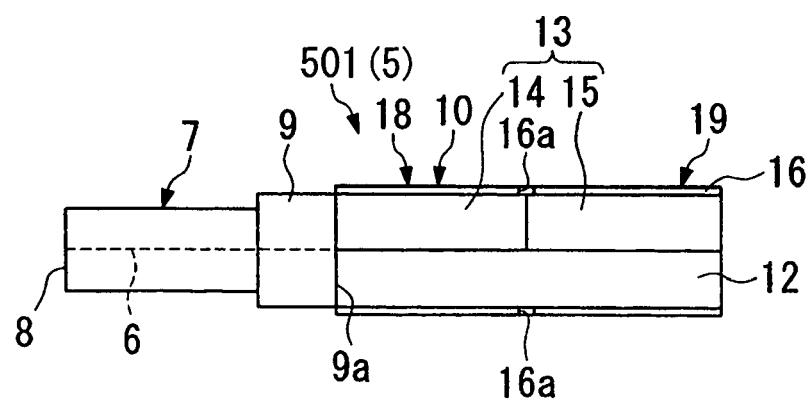
FIG. 7 is a front view for showing a structure for a ferule with a connecting structure of the optical fiber connector shown in FIG. 2A.
Figure 8:
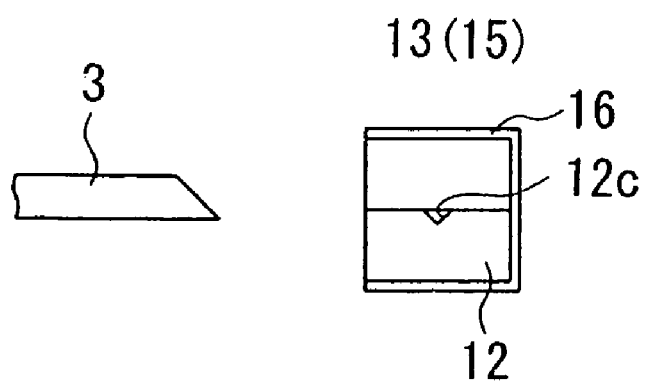
FIG. 8 is a front view for showing a positional relationship between the ferule with the connecting structure shown in FIG. 6 and the open/close member of the optical fiber connecting tool.

In FIG. 3 and FIG. 4, both the housing 502 and the stop ring 503 are sleeve members such that the ferule 7 of the ferule 7A with a connecting structure is contained in the housing 502. The connecting structure 10 of the ferule 7A with a connecting structure is contained in the stop ring 503 which is assembled to a rear end (a right-hand side in FIG. 3 and FIG. 4 for a viewer to the drawings) of the housing 502 by engaging thereto.

Here, in FIG. 3 and FIG. 4, the spring of the reference numeral 504 compresses the ferule 7a with a connecting structure in a direction for an attaching end surface 8 such as a direction for compressing an entire ferule 7A with a connecting structure toward a tip of the housing 502 by using a counter force of the stop ring 503. Here, a farther movement of the ferule 7A with a connecting structure toward the tip of the housing 502 is regulated by contacting a flange section 9 of the ferule 7 at a stopper wall 505 which is a small protrusion which is disposed in an inside of the housing 502. Also, a reference numeral 506 indicates a boot.

It is possible to insert the optical fiber into the optical fiber connecting part 5 by the optical fiber connecting tool 1 such that the optical fiber connecting part 5 should be contained so as to be supported by a groove 103 for containing a part which is formed so be concave from an upper surface 102 of the base 101, the open/close members 2, 3 are driven, and these open/close members 2, 3 should be compressed in the optical fiber connecting part 5. After completing a connecting operation for the optical fibers in the optical fiber connecting part 5, the connecting condition for the optical fibers is maintained because the optical fibers are clamped and supported by a function of the optical fiber connecting part 5 by extracting the open/close members 2, 3 from the optical fiber connecting part 3.

The groove 103 for containing part has a function for supporting the optical fiber connecting part 5 by its inner shape stably. It is supposed to adapt a base 101 which has a groove 103 for containing a part which has a shape for supporting the optical fiber connecting part 5 stably according to a shape of the optical, fiber connecting part 5. Also, in FIGS. 1A and B etc., a block 104 with a groove in which the groove 103 for containing a part is exchangeably attached to the base 101 such that it is possible to dispose the groove 103 for containing a part on the base 101 which correspond to a shape of the optical fiber connecting part 5 by exchanging the block 104 with a groove. For example, it is possible to use the above explained ferule 7A with a connecting groove in an independent manner as an optical fiber connecting part. When the ferule 7A with a connecting structure is disposed in the base 101, a base 101 (or a block 104 with a groove) is adapted which has a groove 103 for containing a part which has a shape so as to be able to support the ferule 7A with a connecting structure stably. Here, the groove 103 for containing a part has a structure such that the optical fiber connecting part 5 can be contained/extracted from above the base 101. Such a base is not limited to a structure which has a block with a groove which is exchangeable; thus, it is possible to adapt a structure in which a groove for containing a part is formed in a base directly.

The ferule 7A with a connecting structure of the above explained optical fiber connector 501 is explained more specifically.

As shown in FIG. 4 and FIG. 5, an optical fiber 6 (a naked optical fiber) is inserted (fixed) in a central section of the ferule 7). In such a case, an end of the optical fiber 6 is formed so as to correspond to an attached end surface of the ferule by a grinding operation; thus, the other end protrudes from a rear end surface 9a of the ferule 7 by a predetermined length. The ferule 7 serves for a fixing section for an optical fiber.

The connecting structure 10 is provided with a connecting element 11 which is formed by a plastic member and a clamping spring 16 which is formed by a metal member which is engaged to an outside of the connecting element 11.

The connecting element 11 has a divided structure in which a base element 12 which has an elongated shape which expands from the rear end section of the ferule 7 and a lid element 13 which is a fracture of a tip shape are assembled such that an end of the base element 12 is connected/fixed to a flange section 9 of the ferule 7. The lid element 13 is divided into two pieces such as a first lid element 14 which is a lid element in an axial direction and a second lid element which is another lid element such that the first lid element 14 should be disposed nearer to the ferule 7 than the second lid element 15 so as to overlap the base element 12. As shown in FIG. 5B, an groove for alignment 12a which positions and aligns the optical fiber 17 which is butt-connected to the optical fiber 6 near the ferule 7 is disposed on a surface which faces to the base element 12 of the first lid element 14 very accurately (in the present embodiment, the optical fiber 17 is an optical fiber core wire, in detail, the optical fiber 17a which is a naked optical fiber which is exposed on a tip of the optical fiber 17 is connected to the optical fiber 6 near the ferule. Such an groove for alignment 12a has a V-shape in the present embodiment. In addition, it is possible to adapt shapes such as a U-shape, and a round shape (a groove which has a half-round shape in its cross section). Also, as shown in FIG. 5A, B, a grooves 12b, 12c for containing a coating which contains the optical fiber 17 which is inserted in the connecting structure 10 from a rear end of the connecting structure 10 (a deep section in right-hand of the drawing, a right-hand in FIG. 4) is formed on a surface which faces to the base element 12 of the second lid element 15 and a surface which faces to the second lid element 15 of the base element 12. In the connecting structure 10, the grooves for containing a coating 12b, 12c are grooves which have an enlarged shape for the groove 12a for alignment so as to be coincidentally in a positional relationship between the base element 12 and the second lid element 15. In addition, the grooves 12b, 12c for containing a coating are connected to the groove 12a for alignment respectively under condition that the connecting element 11 is closed (the lid element 13 is attached to the base element 12). These grooves 12b, 12c for containing a coating also serves a guiding groove for introducing the optical fiber 17a (a naked optical fiber) of the tip of the optical fiber 17 which is inserted into the connecting structure 10 from a rear end (a right-hand deep section in FIG. 5, a right-hand section in FIG. 4) of the connecting structure 10. Here, cross sectional shapes of the grooves 12b, 12c for containing a coating are not necessary to be the same as the shape of the groove 12a for alignment.

Here, it is acceptable as long as the groove for alignment may be formed at least on either the base element 12 or the first lid element 14. Also, it is acceptable if the groove for containing a coating may be formed only on either one of the base element or the lid element.

A clamping spring 16 which has a conduit cross section is engaged on an outside of the base element 12 of the connecting element 11 and the lid element 13 such that the base element 12 and the lid element 13 are maintained under an attached condition by a compressing force of the clamping spring 16. An attaching section of the base element 12 and the lid element 13 is disposed in an aperture section of the clamping spring 16. A notch section 16a which is notched from an end surface of the aperture to a predetermined position is disposed in a central section in a longitudinal direction of the clamping spring 16 such that the first lid element 14 is compressed at a section of the clamping spring 16 which is disposed on a left-hand side of this notch section 16a in a direction for the base element 12 and the second lid element 15 is compressed at a right-hand side in a direction for a base element 12.

Here, as explained later, it is acceptable as long as the lid element 13 has a structure in which a section (in other word, a section in which a groove for alignment is formed; one clamping section which is explained later) for clamping a connecting section in which an optical fibers 6 and 17 are butt-connected and a section (in other word, a section in which a groove for containing a coating is formed; another clamping section which is explained later) for containing and clamping a coating section of the optical fiber 17 are opened/closed by inserting/extracting the two open/close members 2, 3. From this point of view, it is not limited necessarily to a structure in which they are separate; that is, it is possible to adapt a structure in which they are formed unitarily. In case in which they are formed unitarily, for example, it is possible to adapt a structure in which an opening operation and a closing operation are realized separately. Also, it is acceptable as long as two clamping springs are opened/closed separately due to the same reason; that is, it is not necessary to adapt a clamping spring which has a notch section necessarily.

A shape of the clamping spring is not limited to a conduit cross section; thus, it is acceptable if it has a C-letter shape cross section.

The first clamping section 18 as one clamping section is formed by the first lid element 14, a section of the base element 12 which corresponds thereto, and a left-hand section of the clamping spring 16 which is engaged to thereoutside such that the second clamping section 19 as another clamping section is formed by a second lid element 15, a section of a base element 12 which corresponds thereto, and a right-hand section of the clamping spring 16 which is engaged to thereoutside.

As shown in FIG. 1, the optical fiber connecting tool 1 is provided with a base 101 which fixes the optical fiber connector 5, a first open/close member 2 which is an open/close member which can move forwardly and backwardly in a direction of the optical fiber connector 5 which is disposed and fixed on the base 101, and a second open/close member 3 which is another open/close member such that both of the open/close members 2, 3 can be operated independently respectively.

As shown in FIG. 3 and FIG. 4, the tip sections of the first open/close member 1 and the second open/close member 3 are formed in a wedge shape respectively such that the tip section of the first open/close member 2 can be inserted/extracted between the first lid element 14 and the base element 12 and the tip section of the second open/close member 3 can be inserted/extracted between the second lid element 15 and the base element 12.

The first open/close member 2 and the second open/close member 3 are attached on a driving structure (not shown in the drawings) so as to move forwardly and backwardly in a direction of the optical fiber connector 5 on the base 101 by operating the driving structure in dependently. In such a case, it is acceptable if the driving structure may be operated manually and the driving structure may operated automatically by using a dynamic force.

Figure 1B:
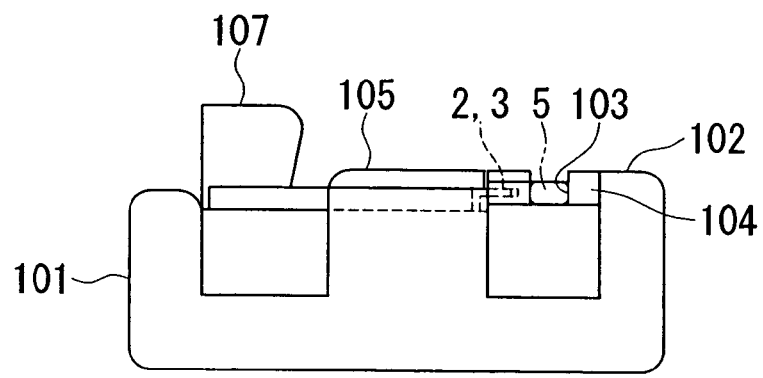
FIG. 1B is a front view for showing an optical fiber connecting tool of FIG. 1B.
Figure 1C:
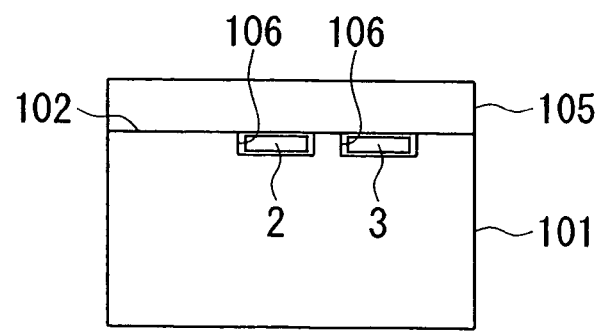
FIG. 1C is a cross section for showing a section hear a guide groove of the optical fiber connection tool of FIG. 1A.
Figure 2A:
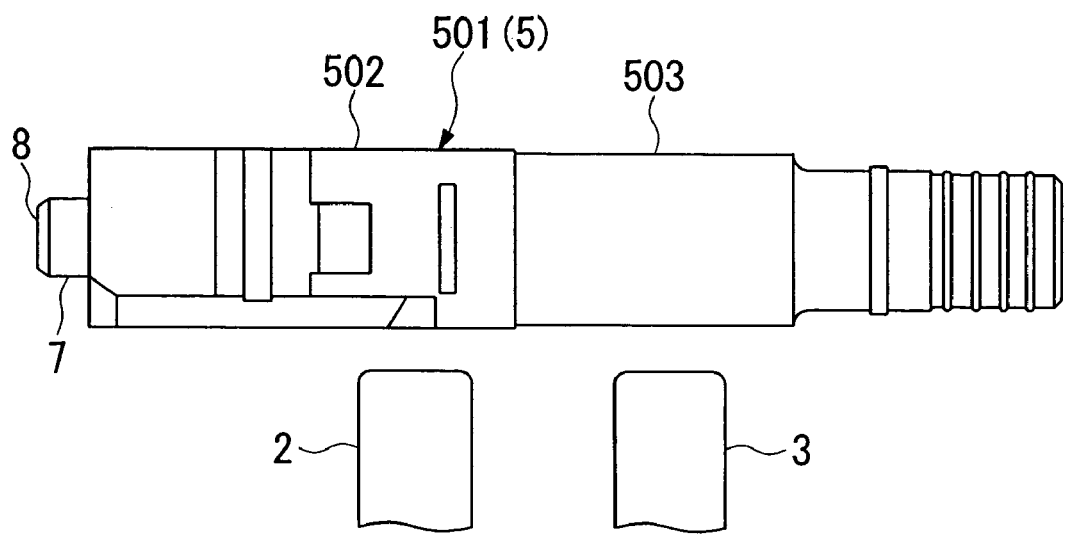
FIG. 2A is a plan vie for showing an example for an optical fiber connector.
Figure 2B:
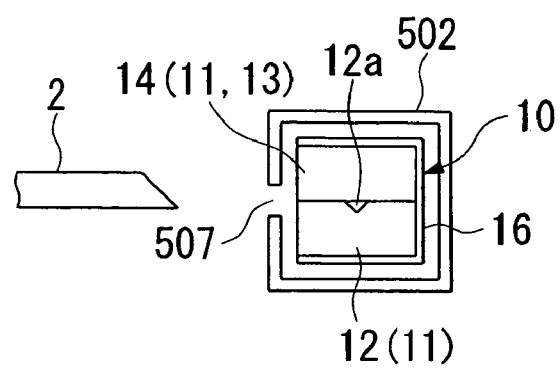
FIG. 2B is a side cross section for showing an inner structure of the optical fiber connector shown in FIG. 2A.

The optical fiber connecting tool 1 which is shown in FIGS. 1A, B have a structure in which the open/close members 2, 3 are operated manually. The open/close members 2, 3 are members which have narrow long shapes such that, as shown in FIGS. 1A to C, a longitudinal direction central section is contained in a guide groove 106 which is secured between the base 101 and a push plate 105 which is attached on the base 101. These open/close members 2, 3 can move forwardly and backwardly toward the groove 103 for containing a part by performing a sliding movement against a base 101 and a push plate 105 by sliding on an inner surface of the guide groove 106. Here, a position shift of the open/close members 2, 3 are prevented except a forward/backward direction toward the groove 103 for containing a part due to an accuracy for forming an inner surface of the guide groove 106. Although the wedge sections of the tip sections of the open/close members 2, 3 are disposed so as to be nearer to the groove 103 for containing a part than the guide groove 106, it is acceptable if the wedge sections of the tips of the open/close members 2, 3 may be drawn in the guide groove 106 by a backward motion of the open/close members 2, 3 (a movement in a direction away from the groove for containing a part).

An operating fracture 107 is attached to the tip sections of the open/close members 2, 3. The tip sections of the open/close members 2, 3 which are protruded opposite to the groove 103 for containing a part from the guide groove 106 are sections which have a function for a handle for operating the open/close members 2, 3 manually. Also, a window 108 which is formed on a push plate 105 serves for a purpose in which a mark which is formed by a coloring operation or making a concavo/convex sections on the open/close members 2, 3 should be observed visually from an outside of the optical fiber connecting tool 1. In the present embodiment, the window 108 and the mark serve for functions as follows. That is, when the mark can be observed from the windows 108, it indicates that the tips of the open/close members 2, 3 protrude at a containing position for the optical fiber connecting part 5 in the groove 103 for containing a part; therefore, there is a possibility in that a containing operation and an extracting operation for the optical fiber connecting part 5 for the groove 103 for containing a part may be disturbed (prohibition for a containing operation and an extracting operation). If the mark is invisible by moving the open/close members 2, 3 in a backward direction (a left-hand side in FIGS. 1A, B) from the groove 103 for containing a part, it indicates that it is possible to contain/extract the optical fiber connecting part 5 for the groove 103 for containing a part. Functions of the mark which is observed from the window 108 is not limited to such a case. For example, it is acceptable to realize functions such that, if the mark is not visible, it is indicates that it is possible to contain/extract the optical fiber connecting part 5 for the groove 103 for containing a part, and if the mark is visible, it indicates a prohibition for containing/extracting therefore.

Here, for example, a stopper (not shown in the drawings) for setting a limit for a movement in a forward direction (compressing direction) toward the groove for containing a part of the open/close members 2, 3 by a protrusion etc. which is protruded from the push plate 105 and a protrusion etc. which is protruded from the base 101 are disposed in the guide groove. Furthermore, it is possible to adapt a structure in which an above explained stopper is formed to be a block with a groove such that a limit for moving the open/close members 2, 3 in a forward direction so as to correspond to a structure of the optical fiber connecting part which is contained in the block with a groove; thus, the optical fiber connecting part should not be damaged by an excessive compression of the open/close members 2, 3.

Figure 9:
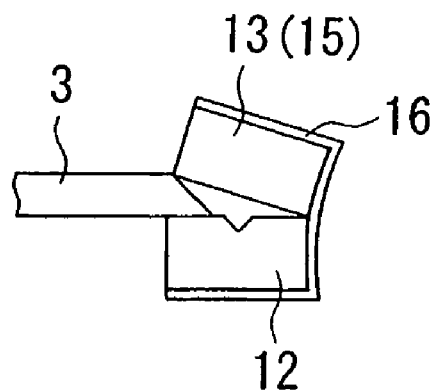
FIG. 9 is a view for explaining a condition in which a first open/close member is inserted in a first clamping section of the ferule with the connecting structure and a second open/close member is inserted in a second clamping section; thus, the first clamping section and the second clamping section are open.
Figure 10:
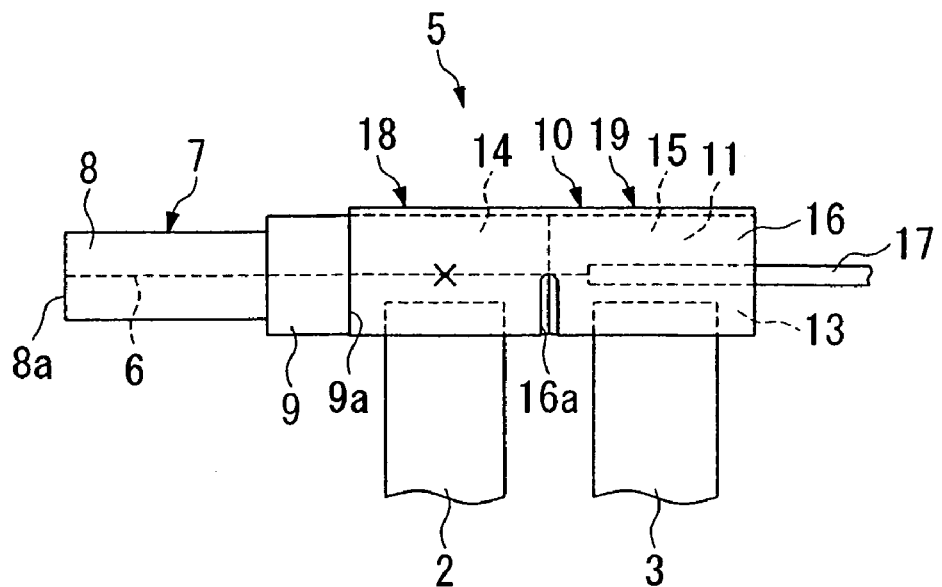
FIG. 10 is a view for explaining a condition in which a newly installed optical fiber is inserted under condition the first clamping section and the second clamping section are open; thus, the end surface of the newly installed optical fiber is butt-connected to an end surface of the pre-installed optical fiber.

In order to attach the optical fiber connecter 501 to a tip section of a newly installed optical fiber 17 by using the optical fiber connecting tool 1 according to the present embodiment which has the above structure, first, as shown in FIGS. 6 to 11 (here, the housing of the optical fiber connector and the stop ring are omitted in the drawings, and a relationship between the ferule 7A with a connecting structure and open/close members 2, 3 is shown clearly), the optical fiber connector 501 is fixed on the base 101 (see FIGS. 1A, B), next, the first open/close member 2 and the second open/close member 3 are moved in a direction of the optical fiber connector 501. The first open/close member 2 and the second open/close member 3 are inserted into wedge inserting holes 507a, 507b (see FIG. 3) which are formed as apertures on a side sections of the stop ring 503 of the optical fiber connector 501. The tip section of the first open/close member 2 is inserted so as to cut inbetween the first lid element 14 of the connecting element 11 and the base element 12 so as to resist to a compressing force of the clamping spring 16 from the wedge inserting hole 507b. The first lid element 14 is opened such that the tip section of the second open/close member 3 is inserted so as to cut inbetween the second lid element 15 and the base element 12 so as to resist to a compressing force of the clamping spring 16 from the wedge inserting hole 507b. The second lid element 15 is opened (see FIG. 9). Here, although FIG. 9 shows a condition in which another clamping section 19 is opened by inserting the open/close member 3, it is certain that it is not necessary to say that one clamping section 18 is opened by inserting the open/close member 2 as similar as a case of FIG. 9.

In addition, the tip section of the newly installed optical fiber 17 is inserted from another end (rear end) of the connecting element 11 along the groove for alignment 12a so as to be butt-connected to the tip of the pre-installed optical fiber 6. The optical fiber 6 near the ferule 7 is inserted so as to be fixed in a fine pour which penetrates the ferule 7 along a center axial line of the ferule 7 in advance. A protruding tip of the ferule 7 is inserted between the base element 12 of the connecting element 11 and the first lid element 13 from an end of the connecting element 11. More specifically, the newly installed optical fiber 17 butt-connects the optical fiber 17a (here, a naked optical fiber) of the tip to the optical fiber 6 which is protruded at the connecting structure 10 from a rear end of the ferule. In addition, both of the optical fibers 6, 17a are butt-connected at a center section in a longitudinal direction of the groove 12a for alignment. The connection is realized by the groove 12a for alignment under accurately positioned and aligned condition each other. The condition for aligning the optical fibers 6, 17a is maintained after (explained later) closing the connecting element 11 of the connecting structure 10.

Figure 11:
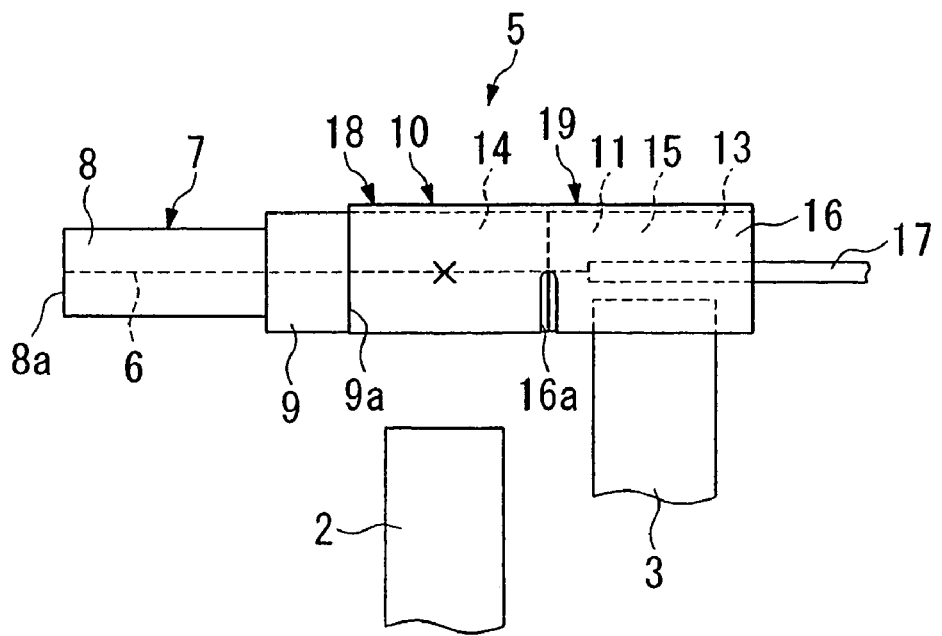
FIG. 11 is a view for explaining a condition in which the first open/close member is extracted from the first clamping section and the first clamping section is closed.

In addition, as shown in FIG. 11, the newly installed optical fiber 17 is compressed in a direction of the pre-installed optical fiber 6 by a predetermined force; thus, the butt-connecting force between the optical fibers 6, 17a is maintained. While maintaining such a condition, the first open/close member 2 is extracted from between the first lid element 14 and the base element 12 by activating the driving structure so as to close the first lid element 14 by a compressing force of the clamping spring 16. The tip section of the optical fiber 6 and the tip section of the newly installed optical fiber 17 are clamped between the first lid element 14 and the base element 12. The tip sections of both of the optical fibers 6, 17 are maintained under a butt-connected condition. Here, even if the optical fibers 6, 17a are not contacted by a refractive index rectifying agent etc. which is injected in the connecting structure 10, in case in which the optical fibers 6, 17 can be connected sufficiently (there is a case in which an optical connection is possible even if there is a slight interval between the optical fibers 6, 17 by a function of the refractive index rectifying agent), it is not necessarily necessary that the butt-connecting force should be applied continuously when one clamp section is closed. It is acceptable if one clamping section is closed under condition that the butt-connecting force is not applied. Even for such a case, it is possible to prevent from applying an unnecessary deformation and bending stress to the optical fiber easily and reliably by steps for closing another clamping section after closing one clamping section. By doing this, it is possible to maintain an optical characteristics for the optical fibers (in particular, a newly installed optical fiber) and realize an improved reliability for a connection between both of the optical fibers. Such a condition can be applied to a case for a connection between the optical fibers in a connecting structure (in particular, in one clamping section) in other embodiments of the present invention.

Figure 12:
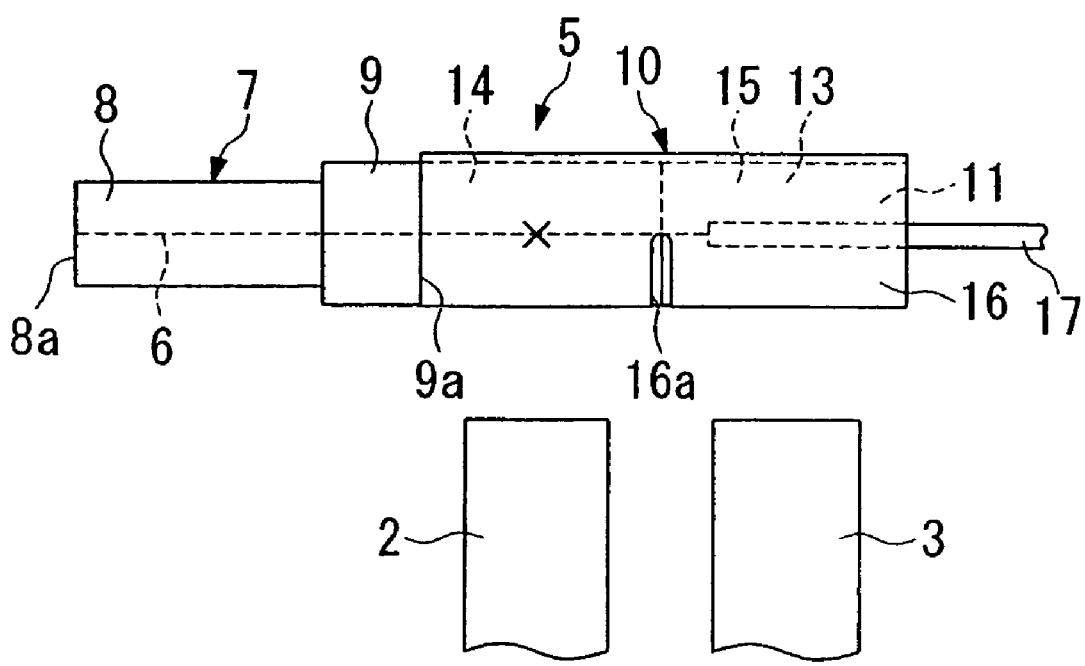
FIG. 12 is a view for explaining a condition in which the second open/close member is extracted from the second clamping section and the second clamping section is closed.
Figure 13A:
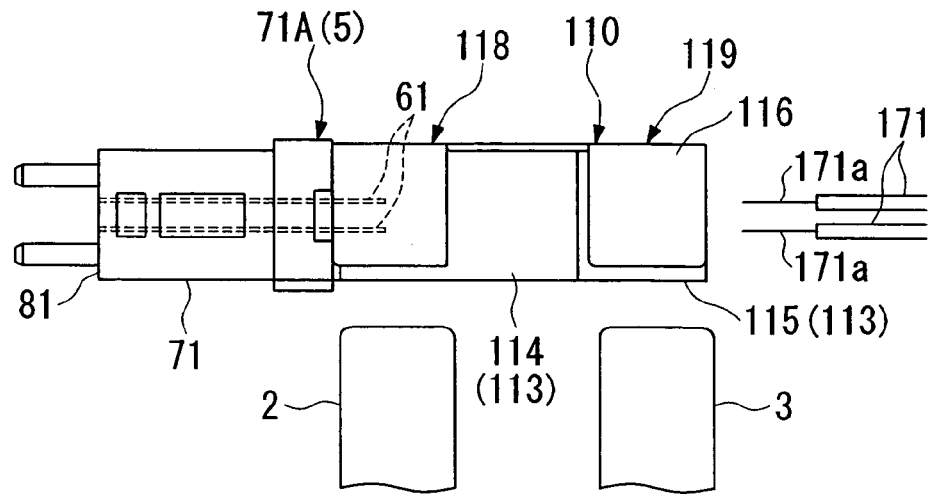
FIG. 13A is a plan view for showing other example for a ferule with the connecting structure.
Figure 13B:
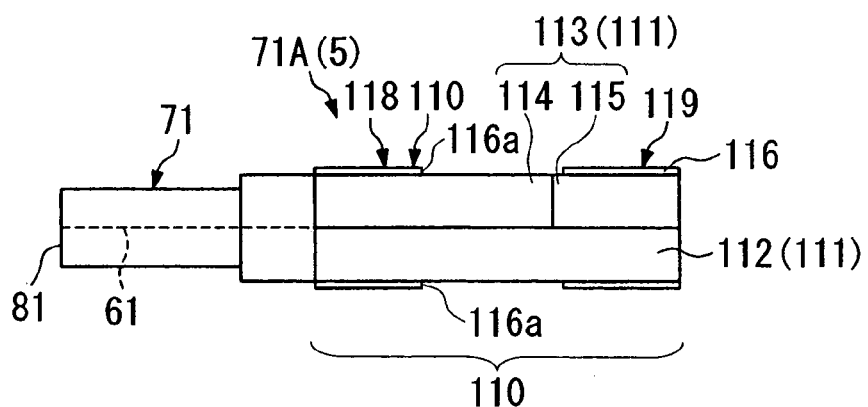
FIG. 13B is a front view for a ferule with the connecting structure shown in FIG. 13A.
Figure 13C:
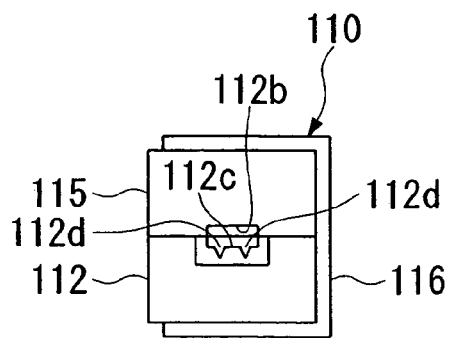
FIG. 13C is a view in which the ferule with the connecting structure shown in FIG. 13A is viewed from a rear end section (an end section which is opposite to the end section which is connected to the ferule).

Next, as shown in FIG. 12, the second open/close member 3 is extracted from between the second lid element 15 and the base element 12 by activating the driving structure. The second lid element 15 is closed by a compressing force of the clamping spring 16. Thus, the coating section of the newly installed optical fiber 17 such as the other clamping section 19 is clamped between the second lid element and the base element 12. When the other clamping section 19 is closed, the butt-connecting force of the optical fiber 17 which faces the optical fiber 6 is released before the optical fiber 17 is clamped by the clamping section 19. Such a feature can be applied to the other embodiments of the present invention commonly when the other clamping section is closed after closing one clamping section.

By doing this, it is possible to attach the optical fiber connector 5 to the tip section of the optical fiber 17; thus, it is possible to maintain a butt-connected condition between the pre-installed optical fiber 6 of the optical fiber connector 5 and the newly installed optical fiber 17.

According to an optical fiber connecting tool 1 according to the present embodiment which has the above explained structure and a method for connecting the optical fibers, the first open/close member 2 and the second open/close member 3 are operated independently; thus, the first open/close member 2 is extracted so as to close the first lid element 14. After this, the second open/close member 3 is extracted so as to close the second lid element 15. According to such a structure, in a case in which the newly installed optical fiber 17 is butt-connected to the tip of the pre-installed optical fiber 6, the second lid element 15 is under opened condition even if there is a deformation on the tip section of the optical fiber 17 or on the tip sections of the both of the optical fibers 6, 17 against the optical fiber 6 by the butt-connecting force between the both of the optical fibers. Therefore, it is possible to release such a deformation in a direction of the newly installed optical fiber 17; thus, the second lid element 15 is closed after completely (or entirely) removing the deformation.

Therefore, it does not occur that the both of the optical fibers 6, 17 are clamped under condition that the deformation is kept generated on the tip sections of the both of the optical fibers 6, 17; thus, loss increases because the optical fibers 6, 17 are bent or the optical fibers 6, 17 may be damaged because the stress is applied on the tip sections for the both of the optical fibers 6, 17 collectively. Thus, it is possible to restrict the defect connection; therefore, it is possible to enhance the reliability greatly.

Furthermore, it is possible to design the first open/close member 2 and the second open/close member 3 separately; thus, it is possible to realize a low cost operation. That is, although the open/close members 2, 3 are adapted which correspond to one clamping section and the another clamping section which are designed respectively (for example, the size of a full aperture of the first lid element 14 of the first clamping section 18 is different from the size of the full aperture of the second lid element 15 of the second clamping section 19), either of them are required to be produced by a very high accuracy so as to correspond to the design for the clamping section which is supposed to be an object to be applied. If it is supposed to form a wedge protrusion which is inserted/extracted in the first clamping section 18 and a wedge protrusion which is inserted/extracted in the second clamping section 19 in one member, it is necessary to perform a precise forming operation in a plurality of sections in one member. In addition, there may occur a necessity for securing a positional relationship between the wedge protrusions accurately; therefore, it is difficult to secure the accuracy and time and labor need to take, and it is difficult to realize a low cost operation. It is possible to manufacture easily and realize a low cost operation by designing the first open/close member 2 and the second open/close member 3 separately.

Here, in the above embodiments, an optical fiber connecting tool according to the present invention is adapted for a single core optical fiber connector 5. Although it is not shown in the drawings, it is certain that similar operation and effect can be realized even if the optical fiber connecting tool according to the present invention is adapted to a multi-core optical fiber connector. Also, in the present embodiment, although two clamping sections are disposed, it is possible to adapt a member in which more than two clamping sections are disposed.

Figure 16:
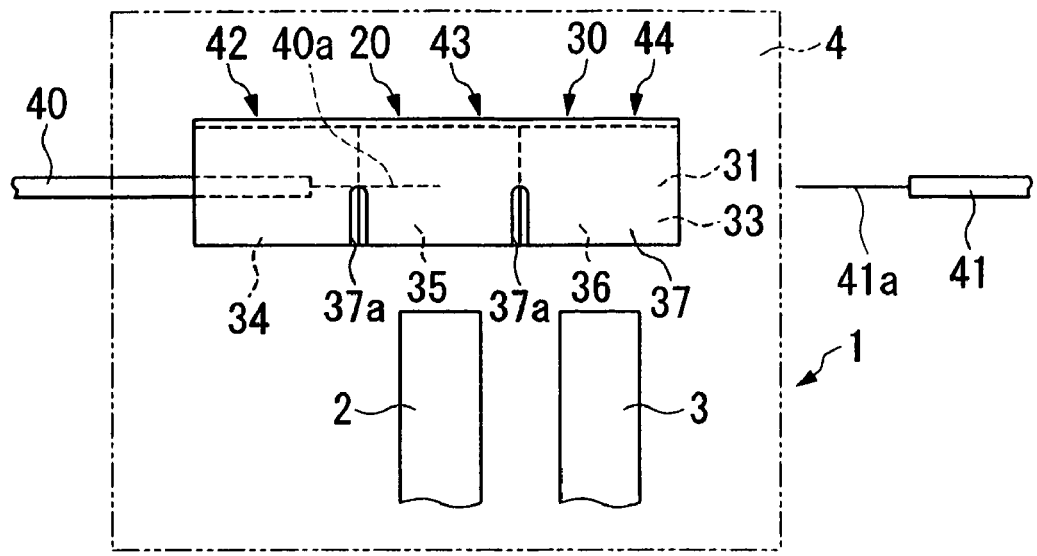
FIG. 16 is an approximate plan view for showing a second embodiment of the present invention which shows an example for a case in which the optical fiber connecting parts which forms a mechanical splice is used for the optical fiber connecting tool according to the present invention.
Figure 17:
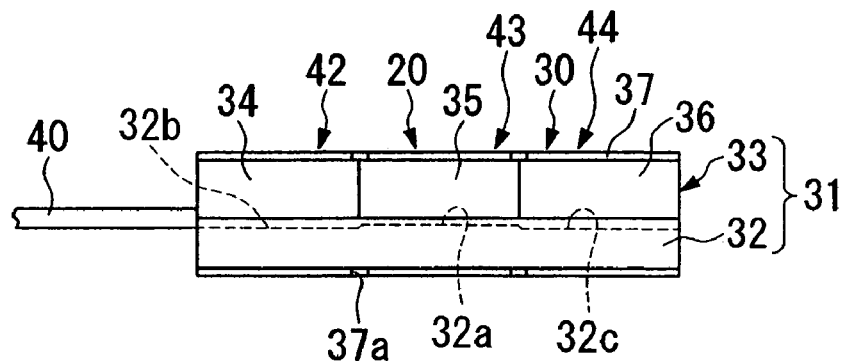
FIG. 17 is a front view for the optical fiber connecting part shown in FIG. 16.
Figure 18A:
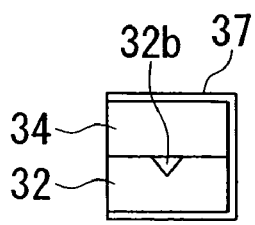
FIG. 18A is a cross section for the optical fiber connecting part shown in FIG. 16 in which either one of the clamping sections which are located on both sides which faces to each other of the one clamping section.
Figure 18B:
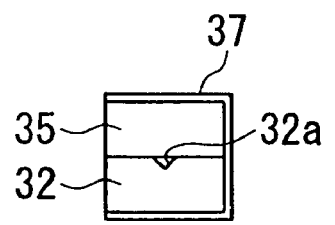
FIG. 18B is a cross section for showing the optical fiber connecting part shown in FIG. 16 in which the one clamping section is shown.
Figure 18C:
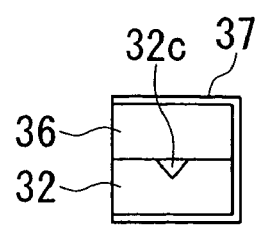
FIG. 18C is a cross section for the optical fiber connecting part shown in FIG. 16 in which the other one of the clamping sections which are located on both sides which faces to each other (other clamping section) of the one clamping section.

For examples for optical fiber connecting parts 5 to which it is possible to adapt the present invention, although it is not limited to the above explained optical fiber connector 501, it is possible to adapt various structures such as a ferule 71a with a connecting structure shown in FIG. 13A to C, and FIG. 14 and a mechanical splice (optical fiber connecting part 20) shown in FIG. 16 to FIG. 18.

Figure 15:
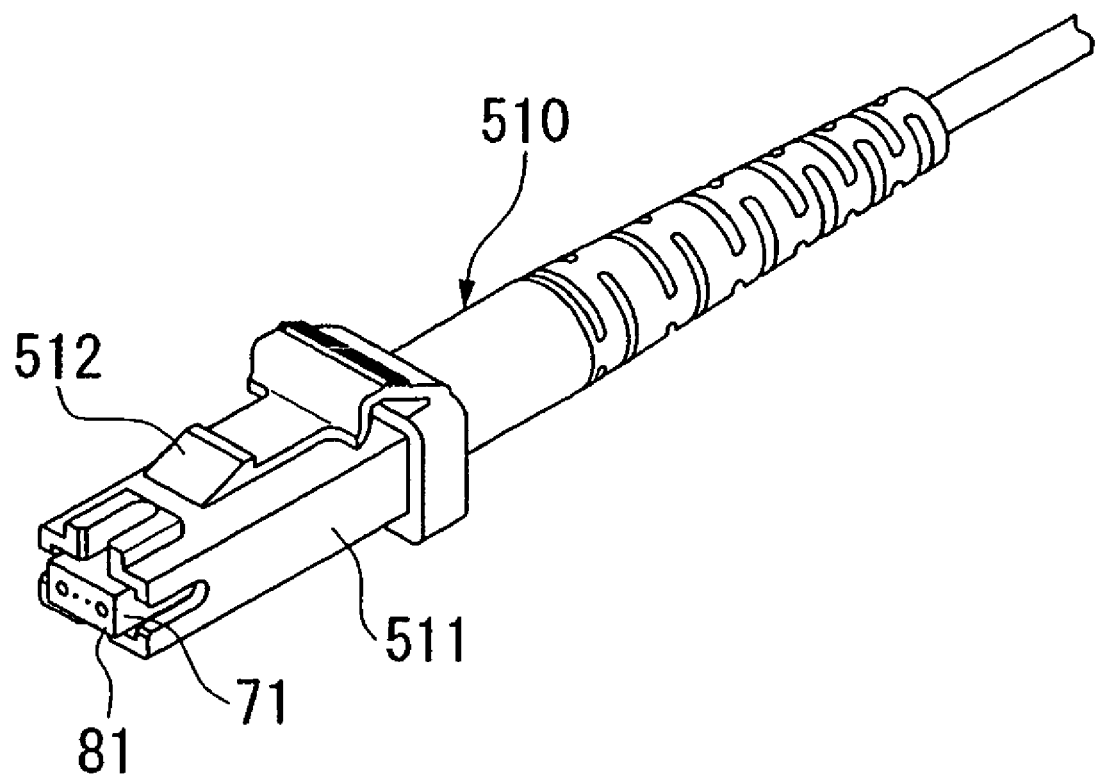
FIG. 15 is an isometric view for showing an example for the optical fiber connector which includes a built-in ferule with the connecting structure shown in FIG. 13A.

Here, the ferule 71A with a connecting structure is built in a housing 511 of the optical fiber connector 510 shown in FIG. 15. The optical fiber connector 510 is so called an MTRJ optical connector in which a latch 512 is disposed so as to protrude on an outside of the housing 511 and detachably engage the connector housing such as an optical connector adapter such that the connecting condition is maintained by an engagement of the latch when it is inserted in the connector housing and the engagement to the connector housing can be released by operating the latch 512.

In the ferule 71A which is shown in FIGS. 13A to C, and FIG. 14, the connecting structure 110 is assembled to a rear end which faces near the connecting end surface 81 (near the tip end). The ferule 71 is defined to be so called an MT optical connector (JIS C 5981, IEC 1754-5 etc., MT; Mechanically Transfearable); thus, it is made of a plastic member. In the ferule 71, a plurality (two pieces in an example shown in the drawings) of optical fibers 61 are inserted so as to be fixed, and the tips of each optical fiber 61 is exposed in an attaching end surface 81. The ferule 71 serves for a fixing section for an optical fiber.

The connecting structure 110 is provided with a connecting element 111 which is formed by a plastic member which is disposed in a rear end of the ferule 71 and a clamping spring 116 which is formed by a metal member which is engaged to an outside of the connecting element 111.

Figure 14:
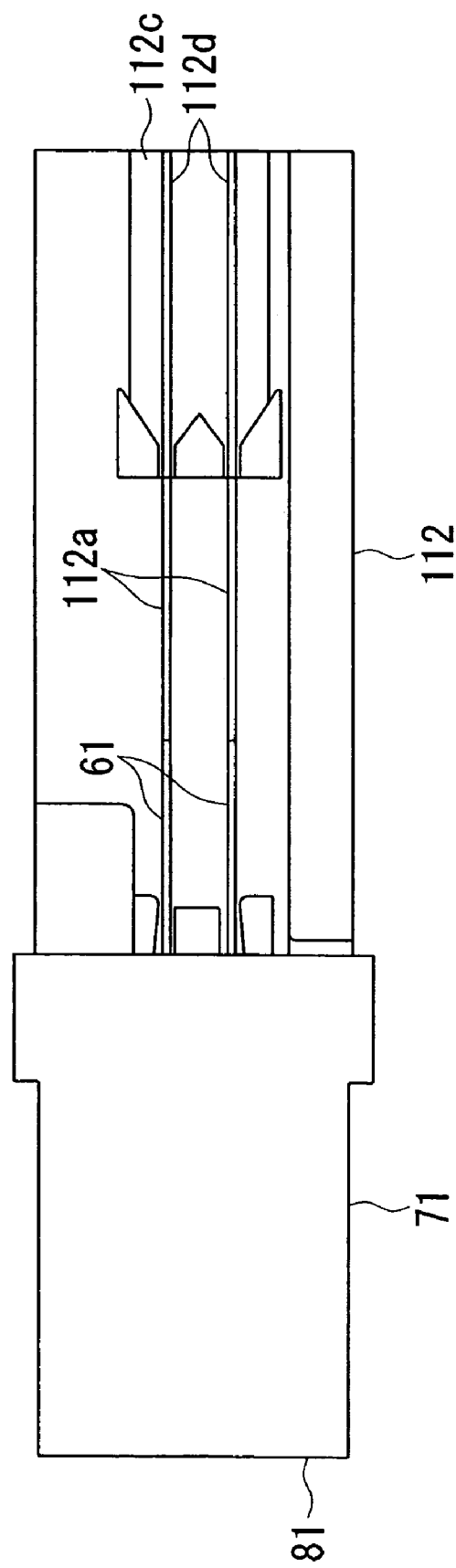
FIG. 14 is a plan view for showing a surface which faces to the lid element of the base element which forms the connecting structure of the ferule with the connecting structure shown in FIG. 13A.

The connecting element 111 has a divided structure in which a base element 112 which has an elongated shape which expands from the rear end section of the ferule 71 and a lid element 113 which is a fracture of a tip shape are assembled such that an end of the base element 112 is connected/fixed to a rear end section of the ferule 71. The lid element 113 is divided into two members such as a first lid element 114 as a lid element in an axial direction and a second lid element as the other lid element. Also, the optical bier 61 near ferule has a protruding section which protrudes from a rear end section of the ferule 71. This protruding part is disposed between the base element 112 and the first lid element 114. As shown in FIG. 14, an groove for alignment 112a which positions and aligns the optical fiber 171 which is butt-connected to the optical fiber 61 is disposed on a surface which faces to the first lid element 114 of the base element 112 very accurately (in the present embodiment, the optical fiber 171 is a single core optical fiber core wire, in detail, the optical fiber 171a which is exposed on the tip of the optical fiber 171 is connected to the optical fiber 61 near the ferule). Such an groove for alignment 112a has a V-shape in the present embodiment. In addition, it is possible to adapt shapes such as a U-shape, and a round shape (a groove which has a half-round shape in its cross section). Also, a grooves 112b, 112c (see FIG. 13C) for containing an optical fiber 171 (in detail, a coating section in which the optical fiber 17a is not exposed) which is inserted in the connecting structure 110 from a rear end of the connecting structure 110 (a right-hand side in FIG. 13) is formed on a surface which faces to the base element 112 of the second lid element 115 and a surface which faces to the second lid element 115 of the base element 112. In the connecting structure 110, the grooves 112b, 112c for containing a coating form a hole which has a rectangular cross shape when an interval between the base element 112 and the second lid element 115. The grooves 112b, 112c for containing a coating clamp so called an optical fiber tape core wire so as to support therefore stably without a movable clearance when an interval between the base element 112 and the second lid element 115 is closed. A plurality of introducing grooves 112d which are continuous from the groove 112a for alignment are formed in parallel on a bottom section of the groove 112c for containing a coating of the base element 112. The introducing groove 112d has a function for introducing the optical fiber 171a (a naked optical fiber) on the tip of the optical fiber 171 which is inserted into the connecting structure 110 from a rear end of the connecting structure 110 to the groove 112a for alignment. Here, cross sectional shapes of the introducing grooves 112d for containing a coating is not necessary to be the same as the shape of the groove 112a for alignment.

Here, it is acceptable as long as the groove for alignment may be formed at least on either the base element 112 or the first lid element 114.

A clamping spring 116 which has a conduit cross section is engaged on an outside of the base element 112 of the connecting element 111 and the lid element 113 such that the base element 112 and the lid element 113 are maintained under an attached condition by a compressing force of the clamping spring 116. An attaching section of the base element 112 and the lid element 113 is disposed in an aperture section of the clamping spring 116. A notch section 116a which is notched from an end surface of the aperture to a predetermined position is disposed in a central section in a longitudinal direction of the clamping spring 116 such that the first lid element 114 is compressed at a section of the clamping spring 116 which is disposed on a left-hand side of this notch section 116a in a direction for the base element 112 and the second lid element 115 is compressed at a right-hand side in a direction for a base element 112.

Here, as explained later, it is acceptable as long as the lid element 113 has a structure in which a section (in other word, a section in which a groove for alignment is formed) for clamping a connecting section in which an optical fibers 61 and 171 are butt-connected and a section (in other word, a section in which a groove for containing a coating is formed) for containing and clamping a coating section of the optical fiber 171 are opened/closed by inserting/extracting the two open/close members 2, 3. From this point of view, it is not limited necessarily to a structure in which they are separate; that is, it is possible to adapt a structure in which they are formed unitarily. In case in which they are formed unitarily, for example, it is possible to adapt a structure in which an opening operation and a closing operation are realized separately. Also, it is acceptable as long as two clamping springs are opened/closed separately due to the same reason; that is, it is not necessary to adapt a clamping spring which has a notch section necessarily.

A shape of the clamping spring is not limited to a conduit cross section; thus, it is acceptable if it has a C-letter shape cross section.

The first clamping section 118 as one clamping section is formed by the first lid element 114 which is disposed nearer to the ferule than the second lid element 115, a section of the base element 112 which corresponds to it, and a left-hand section of the clamping spring 116 which is engaged to an outside of them. The second clamping section 119 which is the other clamping section is formed by a second lid element 115, a section of the base element 112 which corresponds to it, and a right-hand section of the clamping spring 116 which is engaged to an outside of them. Also, it is possible to perform a connecting operation for the optical fibers to this optical fiber connecting part 71A as similarly to a case of the above explained optical fiber connecting part 501 by using the optical fiber connecting tool according to the present invention. Here, it is possible to handle the optical fiber connector 502 which is formed by assembling the ferule 71A with the connecting structure as an optical fiber connecting tool in which it is possible to perform a connecting operation for the optical fibers by using the optical fiber connecting tool according to the present invention by opening a hole for inserting a wedge thereinto for inserting the open/close members 2, 3 in a section near the housing 511.

In a case in which the newly installed optical fiber which is butt-connected to the pre-installed optical fiber 61 which is an optical fiber 61 near the ferule in the connecting structure 110 is an optical fiber tape core wire, the optical fiber (optical fiber tape core wire) is inserted in the connecting structure 110 which is opened by the optical fiber connecting tool 1. Consequently, in order to connect it to the optical fiber 61 of the ferule 71, each of a plurality (the same number as the quantity for the grooves 112a for alignment) of naked optical fibers which are exposed thereat is inserted into the introducing grooves 112d respectively on a bottom section of the grooves 112c for containing a coating of the base element 112. Consequently, it is possible to insert each of the naked optical fiber into the groove 112a for alignment by compressing the optical fiber toward the ferule 71. Also, the coating section of the optical fiber (optical fiber tape core wire) is contained in the grooves 112b, 112c for containing a coating. According to a method for connecting optical fibers according to the present invention, while maintaining a connecting condition of the naked optical fiber of the optical fiber tape core wire and the optical fiber 61 near the ferule, the connecting structure 110 (more specifically, a connecting element 111) is closed by extracting the open/close members 2, 3. Consequently, the optical fibers are clamped so as to be supported in the first clamping section 118 while the butt-connecting condition for the optical fibers is maintained. Next, the coating section of the optical fiber (optical fiber tape core wire) is clamped so as to be supported in the second clamping section 119. As similarly to a case of the above explained optical fiber connecting part 501, it is possible to realize a clamping and supporting operation for the optical fibers under condition that an unnecessary bending of the optical fibers are solved.

For a case of the ferule 71A with the connecting structure, it is possible to connect the optical fiber 61 near the ferule 71 to the connecting structure 110 by inserting a single core optical fiber such as a single core optical fiber core wire. Also, if a connecting element 111 of the connecting structure 110 is closed by extracting the open/close members 2, 3 according to a method for connecting optical fibers according to the present invention, it is possible to maintain a connecting condition for the optical fibers. It is possible to clamp and support a single core optical fiber to the second clamping section 119. For such a case, it is possible to insert the single core optical fiber one by one into the grooves 112a for alignment from the grooves 112b, 112c for containing a coating so as to feed thereinto. In a case of the single optical fiber, the naked optical fiber of which coating on its tip is removed is inserted into the groove 112a for alignment.

Here, the above explained ferule 71A with the connecting structure has a structure which uses a multi-core ferule 71. For such an optical fiber connecting tool according to the present invention, for example, it is possible to adapt a single core member as a ferule which is an MT optical connector. For a connecting structure, it is possible to adapt a structure which adapts a member in which a single member such as a groove for alignment and only one piece of groove for containing a coating is formed.

FIGS. 21A to C, FIG. 22 show a case in which an optical fiber clamp 201 is attached to the optical fiber connecting part 1. As shown in FIG. 21C, the optical fiber clamp 201 has a structure in which a flexible member 202 is supported on a frame body 203. This optical fiber clamp 201 is disposed from a distant position (for example, several tens mm to several hundreds mm) from the base 101 by attaching it to a supporting bar 204 which is fixed on a side section of the base 101 of the optical fiber connecting part 1. The supporting bar 204 is attached detachably on the base 101 by inserting and engage an engaging pin 204a which is protruded on an end in a longitudinal direction on an engaging hole 109a which opens an aperture on a side surface of the 101, and by further absorbing magnetically a magnet 204b which is fixed on an end in the longitudinal direction on a magnet 109b which is disposed on a base 101. The optical fiber clamp 201 is detachably attached to another end section in a longitudinal direction of the supporting bar 204 by engaging the engaging pin 205 which protrudes near the frame body 203 in an engaging hole 204c which has an aperture on the other end section in the longitudinal direction of the supporting bar 204. Here, the structure for attaching the one end in the longitudinal direction of the supporting bar 204 on the base 101 and the structure for detachably attaching the optical fiber clamp 201 on the another end of the longitudinal direction of the supporting bar 204 are not limited to the above explained structures; thus, various structures can be adapted. Also, it is possible to adapt a structure in which a part in which a supporting bar and an optical fiber clamp are unified is detachably attached to the base 101.

The optical fiber clamp 201 is a member which can support an optical fiber easily only by compressing an optical fiber which is supposed to be inserted into an optical fiber connecting part 5 which is engaged in a groove 103 for containing a part of the optical fiber connecting tool into a slit 206 which is formed on a flexible member 202. The above explained slit 206 has a shape which is cut from a side of a section which is exposed from the frame member 203 of the flexible member 202. Also, it is possible to extract an optical fiber which is inserted in the slit 206 from the slit easily.

If the optical fiber connecting part 5 is an optical fiber connector such as above explained ferules 7A, 71A with a connecting structure, and an optical fiber connector in which the the ferules 7A, 71A with such a connecting structure are assembled, the optical fiber connecting part 5 which is contained in the groove 103 for containing a part is supported on the base 101 in the ferule and the connecting structure such that the connecting structure should be disposed toward the optical fiber clamp 201 against the ferule. For example, the optical fiber which is completed to be inserted into the optical fiber connecting part 5 in the groove 103 for containing a part is clamped and supported by the optical fiber clamp 201, the deformation of the optical fiber is secured between the optical fiber connecting part 5 and the optical fiber clamp 201; thus, it is possible to use for securing a compressing force for the optical fiber into the optical fiber connecting part 5 by utilizing a rigidity of the optical fiber which tends to recover to be in a linear manner. Also, as shown in FIG. 21, if a plurality of slits 206 are formed in the flexible member 202, it is possible to use this optical fiber 201 for holding the optical fiber tentatively in an operation for connecting it to the optical fiber near the ferule 71 by inserting a plurality of optical fibers (for example, a single core optical fiber) into the ferule 71A with the connecting structure.

Also, for other examples for the structure, it is possible to adapt a structure in which the above explained supporting bar 204 is a guide member which supports the optical fiber holder slidably which supports the optical fiber in a direction forwardly and backwardly with reference to a supporting position of the optical fiber connecting part in the base 101.

For the optical fiber connecting tool according to the present invention, a member in which the above explained supporting bar 204 is attached on the base 101 and the member in which the optical fiber clamp 201 is further attached thereto are included.

An optical fiber connecting part 20 which is shown in FIG. 16 to FIGS. 18A to C is formed for a single core mechanical splice of which basic structure is similar to that in the first embodiment. Here, it is possible to realize a multi-core function in this optical fiber connecting part 20 by forming a plurality of grooves 32a for alignment which is explained later and grooves 32b, 32c for containing a coating horizontally.

That is, the optical fiber connecting part 20 is formed only by the connecting structure 30. The optical fiber connecting part 20 is provided with a connecting element 31 which is formed by a plastic member etc., and a clamping spring 37 which is formed by a metal member which is engaged to an outside of the connecting element 31.

The connecting element 31 has a divided structure in which a prismatic base element 32 and a prismatic lid element 33 are assembled such that the lid element 33 is divided into three members such as a first lid element in an axial direction, a second lid element 35, and a third lid element 36. The groove 32a for alignment is disposed on a surface which faces to the second lid element 35 of the base element 12 such that it is possible to align an optical fiber 40 to the another optical fiber 41 by this groove 32a for alignment accurately. Grooves 32b, 32c for containing a coating for containing a coating section of the optical fibers 40, 41 are formed on a surface which face the first lid element 34 and the second lid element 36 of the base element 12 so as to be continuous from the groove 32a for alignment. These grooves 32b, 32c for containing a coating are grooves of which aligning accuracy is lower than that of the groove 32a for alignment. These grooves 32b, 32c for containing a coating have function as an introducing groove for introducing the optical fibers 40, 41 which are inserted into the connecting structure 30 from an outside of the optical fiber connecting part to the groove 32a for alignment. Although, in the example shown in the drawings, the groove 32a for alignment and the grooves 32b, 32c for containing a coating are V-grooves, it is not limited to these structure; thus, it is possible to adapt various shapes. Also, the optical fibers 40, 41 are optical fiber core wires in the present embodiment. Naked optical fibers 40a, 41a which are exposed on the tips of the optical fibers 40, 41 are inserted into the groove 32a for alignment so as to be butt-connected. The position for forming the grooves for containing a coating may be on a surface which faces to the base element 12 of the first lid element 34 and the second lid element 36. Also, it is possible to form the grooves for containing a coating on both a surface which faces to the first lid element 34 and the second lid element 36 of the base element 12 and a surface which faces to the base element 12 of the first lid element 34 and the second lid element 36. The groove for alignment is not limited to the base element; thus, it is possible to form the groove for alignment on the lid element, also on both of the lid element and the base element.

The clamping spring 37 which has a conduit shape cross section with a similar structure to a member which is shown in the first embodiment is engaged to an outside of the base element 32 of the connecting element 31 and the lid element 33 such that the base element 32 and the lid element 33 are supported so as to be under an attached condition by a compressing force of this clamping spring 37. In such a case, a section in which the base element 32 and the lid element 33 are attached is positioned on an aperture section of the clamping spring 37. Also, a notch section 37a which is cut from an aperture end surface to a predetermined position is disposed on two positions in a longitudinal direction of the clamping spring 37 such that the first lid element 34 is compressed at a left-hand section of the clamping spring 37 in a direction of the base element 32 by this notch section 37a, the second lid element 35 is compressed in a direction of the base element 32 in a central section, and the third lid element 36 is compressed in a direction of the base element 32 in a right-hand section.

The first clamping section 42 is formed by the first lid element 34, a section of the base element 32 which corresponds to it, and a left-hand section of the clamping spring 37 which is engaged to outsides of them. The second clamping section 43 (one clamping section) is formed by the second lid element 35, a section of the base element 32 which corresponds to it, and a central section of the clamping spring 37 which is engaged to outsides of them. The third clamping section 44 (another clamping section) is formed by the third lid element 36, a section of the base element 32 which corresponds to it, and a right-hand section of the clamping spring 37 which is engaged to outsides of them.

Consequently, in order to connect two optical fibers 40, 41 by the optical fiber connecting part 20 by using the optical fiber connecting tool 1 according to the embodiment which has the above explained structure, the optical fiber connector is fixed on the base 101. The first open/close member 2 and the second open/close member 3 is moved forwardly in a direction of the optical fiber connecting part 20 by operating a driving structure. The tip section of the first open/close member 2 is inserted between the second lid element 35 of the connecting element 31 and the base element 32 so as to resist the compressing force of the clamping spring 37. The second lid element 35 is opened. The tip section of the second open/close member 3 is inserted between the third lid element 36 and the base element 32 so as to resist the compressing force of the clamping spring 37. The third lid element 36 is opened. The optical fiber 40 is inserted into the groove 32a for alignment from one side of the connecting structure 30 in advance such that its tip should be disposed on the groove 32a for alignment. The coating section is under condition that it is clamped so as to be clamped between the first lid element 34 and the base element 32. The coating section of the optical fiber 40 is contained in the groove 32b for containing a coating so as to be clamped and fixed by the first clamping section 42. The first clamping section 42 serves for an optical fiber fixing section.

Consequently, the another optical fiber 41 is inserted along the groove 32a for alignment from another end of the connecting element 31. The tip of the another optical fiber 41 is disposed between the second lid element 35 and the base element 32 via the third lid element 36 so as to be butt-connected to the tip of the optical fiber 40.

Consequently, the another optical fiber 41 is compressed in a direction of the optical fiber 40 so as to secure the butt-connecting force for both of the optical fibers 40, 41. Under such a condition, the driving structure is operated so as to extract the first open/close member 2 from between the second lid element 35 and the base element 32. The second lid element 35 is closed by a compressing force of the clamping spring 37. The tip section of the optical fiber 40 (a naked optical fiber 40a which is exposed on the tip of the optical fiber 40) and a tip section of the another optical fiber 41 are clamped between the second lid element 35 and the base element 32. The tip sections for the both of the optical fibers 40, 41 are maintained under a butt-connected condition.

Consequently, after the second clamping section 43 is closed, a force for compressing the another optical fiber 41 in a direction of the optical fiber 40 is released. Under such a condition, the driving structure is operated so as to extract the second open/close member 3 from between the third lid element 36 and the base element 32. The third lid element 36 is closed by a compressing force of the clamping spring 37. The coating section of the another optical fiber 41 is clamped between the third lid element 36 and the base element 32.

By doing this, it is possible to maintain the condition under which the optical fiber 40 and the another optical fiber 41 are butt-connected via the optical fiber connecting part.

In the optical fiber connecting tool 1 according to the present embodiment which has the above explained structure, the first open/close member 2 and the second open/close member 3 are operated independently, and the first open/close member 2 is extracted so as to close the second lid element 35. After that, the second open/close member 3 is extracted so as to close the third element 36. By doing this, in a case in which the another optical fiber 41 is butt-connected to the tip of the optical fiber 40, if there occurs a deformation on a tip sections of the both of the optical fibers 40, 41 due to the butt-connecting force, the third lid element 36 is still under an opened condition when the second lid element 35 is closed. Therefore, it is possible to dispose such a deformation in a direction of the optical fiber 41; thus, the third lid element 36 is closed after removing the deformation completely (otherwise mostly).

Therefore, there do not occur a case in which the both of the optical fibers 40, 41 are clamped while a deformation is generated on the tip sections of the both of the optical fibers 40, 41, the loss increases due to bending the optical fibers 40, 41, and a stress is concentrated on the tip sections of the both of the optical fibers 40, 41; thus, they are broken. Therefore, it is possible to eliminate the defect connection; thus, it is possible to enhance the reliability greatly.

Figure 19:
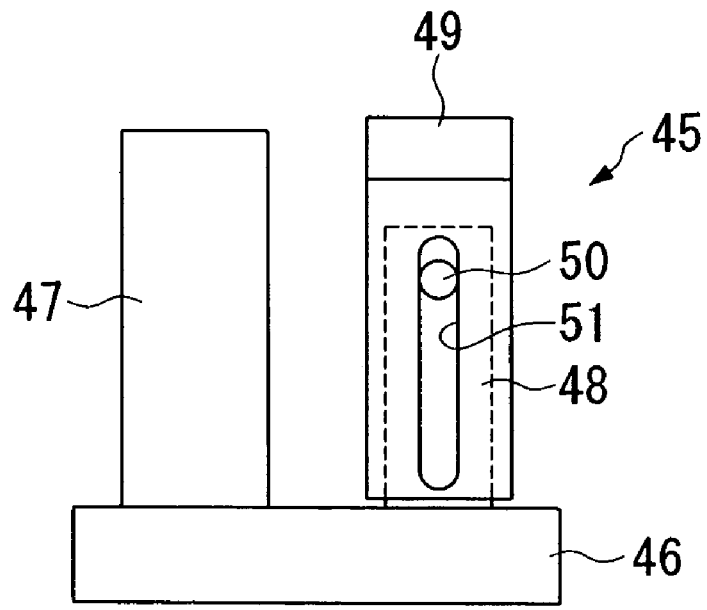
FIG. 19 is an approximate plan view for showing a third embodiment of the optical fiber connecting tool according to the present invention.
Figure 20:
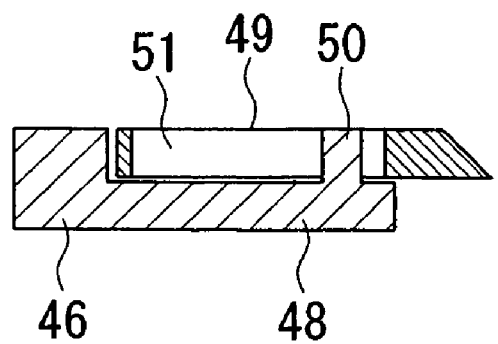
FIG. 20 is a vertical cross section for showing an open/close member of the optical fiber connecting tool shown in FIG. 19.

In FIG. 19 and FIG. 20, a third embodiment of the optical fiber connecting tool according to the present invention is shown. In the optical fiber connecting tool 45, a first open/close member 47 and a supporting member 48 are connected unitarily to an operating lever 46, and simultaneously, a second open/close member 49 is attached the supporting member 48, and a pin 50 which is disposed on the supporting member 48 is disposed in a long hole 51 which is formed on the second open/close member 49. The other structure is similar to that shown in the above explained first and the second embodiments.

The member which is shown in the present embodiment realizes a similar operability and an effect which are shown in the above explained first and the second embodiments. In a case in which a newly installed optical fiber is butt-connected to a tip of a pre-installed optical fiber, or in a case in which a tip of an optical fiber is butt-connected to a tip of another optical fiber, even if there is a deformation which is generated on the tip sections for the both of the optical fibers due to the butt-connecting force, the second lid element or the third lid element are under opened condition when the first lie element or the second lid element is closed. Therefore, it is possible to dispose such a deformation in a direction of the newly installed optical fiber or the another optical fiber,; thus, the second lid element or the third lid element 36 are closed after removing the deformation completely (otherwise mostly).

Therefore, there do not occur a case in which the both of the optical fibers are clamped while a deformation is generated on the butt-connected section of the both of the optical fibers, the loss increases due to bending the optical fibers, and a stress is concentrated on the tip sections of the both of the optical fibers; thus, they are broken. Therefore, it is possible to eliminate the defect connection; thus, it is possible to enhance the reliability greatly.

Also, in the present embodiment, when the operating lever 46 is operated in a direction (more specifically, a direction of the connecting structure) of the optical fiber connecting part, it is possible to move the first open/close member 47 and the second open/close member 49 forwardly in a direction of the connecting structure simultaneously (regarding the second open/close member 49, more specifically, a rear end which faces to the tip which is inserted into the connecting structure of the second open/close member 49 is compressed by the operating lever 46 so as to be moved forwardly toward the connecting structure). Coincidentally, when the operating lever 46 is operated in a direction so as to be separate from the connecting structure, the first open/close member 47 and the operating lever 46 are moved backwardly unitarily so as to be separate from the connecting structure. After that, after a time-lag, the pin 50 of the supporting member 48 contacts an end surface of the long hole 51 of the second open/close member 49. By doing this, the second open/close member 49 retreats in a direction so as to be separate from the connecting structure. Therefore, it is possible to simplify the structure for operating the first open/close member 47 and the second open/close member 49.

Here, in the above explained embodiments, an operation for closing the another clamping section starts after closing the clamping section. However, the present invention is not limited to such a structure. It is possible to adapt a structure in which the movement of the closing the another clamping section is started (before completing the clamping operation for the pre-installed optical fiber and the newly installed optical fiber in the one clamping section) before completing the closing movement of the one clamping section.

The invention claimed is:

1. A method for connecting optical fibers through a connecting structure having first and second clamping sections using an optical fiber connecting tool having first and second opening/closing member, the method comprising:
opening the first clamping section by inserting the first opening/closing member into the first clamping section and opening the second clamping section by inserting the second opening/closing member into the second clamping section;
inserting a first optical fiber into the first clamping section and inserting a second optical fiber into the fist clamping section through the second clamping section so as to butt-connect a tip of the first optical fiber to a tip of the second optical fiber;
extracting the first opening/closing member from the first clamping section so as to clamp peripheries of the first and second optical fibers; and
extracting the second opening/closing member from the second clamping section so as to clamp the periphery of the second optical fiber.

2. An optical fiber connecting tool according to claim 1, wherein an optical fiber fixing section which clamps the preinstalled first optical fiber to a ferrule is disposed in a region which is provided on the opposite side of the second clamping section through the first clamping section, so as to fix the pre-installed first optical fiber.

3. The method of claim 1, further comprising:
preparing the second optical fiber for insertion by exposing the optical fiber in an end of a coated optical cable;
inserting the exposed optical fiber and the coated optical cable; and
butt-connecting a tip of the exposed optical fiber of the coated optical cable to the first optical fiber by clamping the exposed optical fiber in the first clamping section and clamping a portion of the coated optical cable in the second clamping section of the optical fiber connecting tool.

4. The method of claim 1, further comprising:
applying a compressive force on second optical fiber toward the first optical fiber;
opening the second clamping section while maintaining the compressive force;
releasing the compressive force; and
closing the second clamping section.

5. A method for connecting optical fibers through a connecting structure having first and second clamping structures using an optical fiber connecting tool having first and second opening/closing members, the method comprising:
inserting a first optical fiber into the first clamping section in which a first opening/closing member is pre-installed and inserting a second optical fiber into the first clamping section through the second clamping section in which a second opening/closing member is pre-installed so as to butt-connect a tip of the first optical fiber to a tip of the second optical fiber; and
extracting the first opening/closing member from the first clamping section so as to clamp a peripheries of the first and second optical fibers; and
extracting the second opening/closing member from the second clamping section so as to clamp a periphery of the second optical fiber.

6. A method for connecting optical fibers through a connecting structure having first and second clamping sections using an optical fiber connecting tool having first and second opening/closing members, the method comprising:
opening the first and second clamping sections by inserting the first and second opening/closing members into the first and second clamping section;
inserting a second optical fiber into the first clamping section through the second clamping section so as to butt-connect a tip of the second optical fiber to a tip of a first optical fiber which is pre-installed in the first clamping section;
extracting the first opening/closing member from the first clamping section so as to clamp peripheries of the first and second optical fibers; and
extracting the second opening/closing member from the second clamping section so as to clamp a periphery of the second optical fiber.

7. A method for connecting optical fibers through a connecting structure having first and second clamping sections using an optical fiber connecting tool having first and second opening/closing members, the method comprising:
inserting a second optical fiber into the first clamping section which is opened by the first opening/closing member through the second clamping section which is opened by the second opening/closing member so as to butt-connect a tip of the second optical fiber to a tip of a first optical fiber which is pre-installed in the first clamping section;

extracting the first opening/closing member from the first clamping section so as to clamp peripheries of the first and second optical fibers; and extracting the second opening/closing member from the second clamping section so as to clamp a periphery of the second optical fiber.

8. A method according to claim 6, wherein the first optical fiber is fixed to a ferrule connected to the first clamping section.

9. A method according to claim 7, wherein the first optical fiber is fixed to a ferrule connected to the first clamping section.

10. A method for connecting optical fibers through a connecting structure having first to third clamping sections in which the first clamping section is disposed in a region on an opposite side of the third clamping section through the second clamping section, using an optical fiber connecting tool having first and second opening/closing members, the method comprising:

opening the second and third clamping sections by inserting the first and second opening/closing members into the second and third clamping section;

inserting a second optical fiber into the second clamping section through the third clamping section so as to butt-connect a tip of the second optical fiber to a tip of a first optical fiber which is clamped by the first clamping section and pre-installed in the second clamping section;

extracting the first opening/closing member from the second clamping section so as to clamp peripheries of the first and second optical fibers; and extracting the second opening/closing member from the third clamping section so as to clamp a periphery of the second optical fiber.

11. A method for connecting optical fibers through a connecting structure having first to third clamping sections in which the first clamping section is disposed in a region on an opposite side of the third clamping section through the second clamping section, using an optical fiber connecting tool having first and second opening/closing members, the method comprising:

inserting a second optical fiber into the second clamping section which is opened by the first opening/closing member through the third clamping section which is opened by the second opening/closing member so as to butt-connect a tip of the second optical fiber to a tip of a first optical fiber which is clamped by the first clamping section and pre-installed in the second clamping section;

extracting the first opening/closing member from the second clamping section so as to clamp peripheries of the first and second optical fiber; and extracting the second opening/closing member from the third clamping section so as to clamp a periphery of the second optical fiber.

12. A method for connecting optical fibers according to claim 1, wherein butt- connection force is maintained between the first and second optical fibers before the clamp of the second optical fiber by the second clamping section.

13. method for connecting optical fibers according to claim 5, wherein butt- connection force is maintained between the first and second optical fibers before the clamp of the second optical fiber by the second clamping section.

14. A method for connecting optical fibers according to claim 6, wherein butt- connection force is maintained between the first and second optical fibers before the clamp of the second optical fiber by the second clamping section.

15. A method for connecting optical fibers according to claim 7, wherein butt- connection force is maintained between the first and second optical fibers before the clamp of the second optical fiber by the second clamping section.

16. A method for connecting optical fibers according to claim 10, wherein butt- connection force is maintained between the first and second optical fibers before the clamp of the second optical fiber by the second clamping section.

17. A method for connecting optical fibers according to claim 11, wherein butt- connection force is maintained between the first and second optical fibers before the clamp of the second optical fiber by the second clamping section.

18. A method for connecting optical fibers according to claim 1, wherein the extraction of the second opening/closing member from the second clamping section is started after the extraction of the first opening/closing member from the first clamping section is completed.

19. A method for connecting optical fibers according to claim 5, wherein the extraction of the second opening/closing member from the second clamping section is started after the extraction of the first opening/closing member from the first clamping section is completed.

20. A method for connecting optical fibers according to claim 6, wherein the extraction of the second opening/closing member from the second clamping section is started after the extraction of the first opening/closing member from the first clamping section is completed.

21. A method for connecting optical fibers according to claim 7, wherein the extraction of the second opening/closing member from the second clamping section is started after the extraction of the first opening/closing member from the first clamping section is completed.

22. A method for connecting optical fibers according to claim 10, wherein the extraction of the second opening/closing member from the third clamping section is started after the extraction of the first opening/closing member from the second clamping section is completed.

23. A method for connecting optical fibers according to claim 11, wherein the extraction of the second opening/closing member from the third clamping section is started after the extraction of the first opening/closing member from the second clamping section is completed.

24. A method for connecting optical fibers according to claim 1, wherein the extraction of the second opening/closing member from the second clamping section is started before the extraction of the first opening/closing member from the first clamping section is completed.

25. A method for connecting optical fibers according to claim 5, wherein the extraction of the second opening/closing member from the second clamping section is started before the extraction of the first opening/closing member from the first clamping section is completed.

26. A method for connecting optical fibers according to claim 6, wherein the extraction of the second opening/closing member from the second clamping section is started before the extraction of the first opening/closing member from the first clamping section is completed.

27. A method for connecting optical fibers according to claim 7, wherein the extraction of the second opening/ closing member from the second clamping section is started before the extraction of the first opening/closing member from the first clamping section is completed.

28. A method for connecting optical fibers according to claim 10, wherein the extraction of the second opening/closing member from the third clamping section is started before the extraction of the first opening/closing member from the second clamping section is completed.

29. A method for connecting optical fibers according to claim 11, wherein the extraction of the second opening/closing member from the third clamping section is started before the extraction of the first opening/closing member from the second clamping section is completed.

* * * * *